(12) United States Patent
Hatfield et al.

(10) Patent No.: US 11,841,094 B2
(45) Date of Patent: Dec. 12, 2023

(54) VALVE

(71) Applicant: TTP Ventus Ltd., Royston (GB)

(72) Inventors: Stuart Hatfield, Royston (GB); James Samuel Bumby, Royston (GB)

(73) Assignee: TTP VENTUS LTD., Royston (GB)

(*) Notice: Subject to any disclaimer, the term of this patent is extended or adjusted under 35 U.S.C. 154(b) by 249 days.

(21) Appl. No.: 17/299,708

(22) PCT Filed: Dec. 6, 2019

(86) PCT No.: PCT/GB2019/053458
§ 371 (c)(1),
(2) Date: Jun. 3, 2021

(87) PCT Pub. No.: WO2020/115502
PCT Pub. Date: Jun. 11, 2020

(65) Prior Publication Data
US 2022/0057019 A1 Feb. 24, 2022

(30) Foreign Application Priority Data

Dec. 7, 2018 (GB) ...................... 1820025

(51) Int. Cl.
*F16K 99/00* (2006.01)
*F04B 39/10* (2006.01)
*F04B 53/10* (2006.01)

(52) U.S. Cl.
CPC ...... *F16K 99/0015* (2013.01); *F16K 99/0005* (2013.01); *F16K 99/0028* (2013.01);
(Continued)

(58) Field of Classification Search
CPC ............ F16K 99/0015; F16K 99/0005; F16K 99/0028; F16K 2099/0086;
(Continued)

(56) References Cited

U.S. PATENT DOCUMENTS 4,164,238 A * 8/1979 Riedel ................. F04B 39/1053
137/516.25
6,309,194 B1 10/2001 Fraser et al.
(Continued)

FOREIGN PATENT DOCUMENTS

CH 597544 A5 4/1978
CN 2549207 Y 5/2003
(Continued)

OTHER PUBLICATIONS

International Search Report and Written Opinion for International Application No. PCT/GB2019/053458, dated Feb. 19, 2020.
(Continued)

*Primary Examiner* — Minh Q Le
(74) *Attorney, Agent, or Firm* — CANTOR COLBURN LLP

(57) ABSTRACT

A valve includes a first plate, a second plate, a spacer disposed between the first plate and the second plate, and a flap movably disposed between the first plate and the second plate. The first plate includes a plurality of first apertures extending through said first plate and the second plate includes a plurality of second apertures extending through said second plate. The second apertures are substantially offset from the first apertures. The spacer forms a cavity between the first plate and the second plate and is in fluid communication with the first apertures and the second apertures. The flap has apertures substantially offset from the first apertures and substantially aligned with the second apertures, and the flap is operable to be motivated between said first and second plates in response to a change in direction of the differential pressure of the fluid across the valve.

18 Claims, 20 Drawing Sheets

(52) U.S. Cl.
CPC ......... *F04B 39/108* (2013.01); *F04B 39/1066* (2013.01); *F04B 53/1067* (2013.01); *F04B 53/1087* (2013.01); *F16K 2099/0086* (2013.01); *F16K 2099/0094* (2013.01)

(58) Field of Classification Search
CPC .......... F16K 2099/0094; F04B 39/1066; F04B 39/108; F04B 53/1067; F04B 53/1087
USPC ................ 137/512.15, 825, 829, 512.4, 845; 251/331, 335.2
See application file for complete search history.

(56) References Cited

U.S. PATENT DOCUMENTS

| | | | |
|---|---|---|---|
| 8,646,479 B2* | 2/2014 | Jaeb | F04B 53/106 137/859 |
| 8,763,633 B2* | 7/2014 | Buckland | F04B 39/1066 137/625.33 |
| 10,598,192 B2 | 3/2020 | Bukland et al. | |
| 2004/0120836 A1 | 6/2004 | Dai et al. | |
| 2004/0161352 A1* | 8/2004 | Nieter | F04B 39/1066 417/569 |
| 2007/0242427 A1 | 10/2007 | Yamamoto et al. | |
| 2009/0015097 A1 | 1/2009 | Meng et al. | |
| 2010/0140527 A1* | 6/2010 | Glime | F16K 25/00 251/359 |
| 2010/0290935 A1 | 11/2010 | Richter et al. | |
| 2013/0276906 A1* | 10/2013 | Locke | F16K 15/14 137/15.01 |
| 2017/0218949 A1* | 8/2017 | Yokoi | F04B 49/06 |
| 2019/0203703 A1* | 7/2019 | Shabanian | F04B 43/043 |
| 2019/0226472 A1* | 7/2019 | Tanaka | F04B 39/10 |
| 2020/0332790 A1 | 10/2020 | Tanaka | |
| 2020/0371536 A1 | 11/2020 | Tanaka et al. | |
| 2021/0003226 A1* | 1/2021 | Yokoi | F04B 43/046 |

FOREIGN PATENT DOCUMENTS

| | | |
|---|---|---|
| CN | 1455107 A | 11/2003 |
| CN | 102638166 A | 8/2012 |
| CN | 106787898 A | 5/2017 |
| EP | 042087 A1 | 4/1991 |
| GB | 2576796 A | 3/2020 |
| GB | 2577710 A | 4/2020 |
| JP | S57171460 U | 10/1982 |
| JP | 2008002387 A | 1/2008 |
| JP | 2009079482 A | 4/2009 |
| JP | 2014238012 A | 12/2014 |
| WO | WO2006/111775 | 10/2006 |
| WO | WO2009/152775 | 12/2009 |
| WO | WO2010/139917 | 12/2010 |
| WO | WO2010/139918 | 12/2010 |
| WO | WO2012/061044 | 5/2012 |
| WO | WO2013/117945 | 8/2013 |
| WO | WO2013/134056 | 9/2013 |
| WO | WO2015/173280 | 11/2015 |
| WO | WO2018/049060 | 3/2018 |
| WO | WO2020/070498 | 4/2020 |
| WO | WO2020/128426 | 6/2020 |

OTHER PUBLICATIONS

Combined Search and Examination Report for GB Application No. GB1820025.3, dated May 14, 2019.
International Search Report and Written Opinion for International Application No. PCT/GB2019/053459, dated Feb. 19, 2020.
Combined Search and Examination Report for GB Application No. GB1900952.1, dated Mar. 27, 2019.
Examination Report for GB Application No. GB1900952.1, dated Nov. 12, 2020.
International Search Report and Written Opinion for International Application No. PCT/GB2019/052789, dated Jan. 3, 2020.
Search Report for GB Application No. GB1816156.2, dated Mar. 29, 2019.
Combined Search and Examination Report for GB Application No. GB2012420.2, dated Jan. 6, 2021.

* cited by examiner

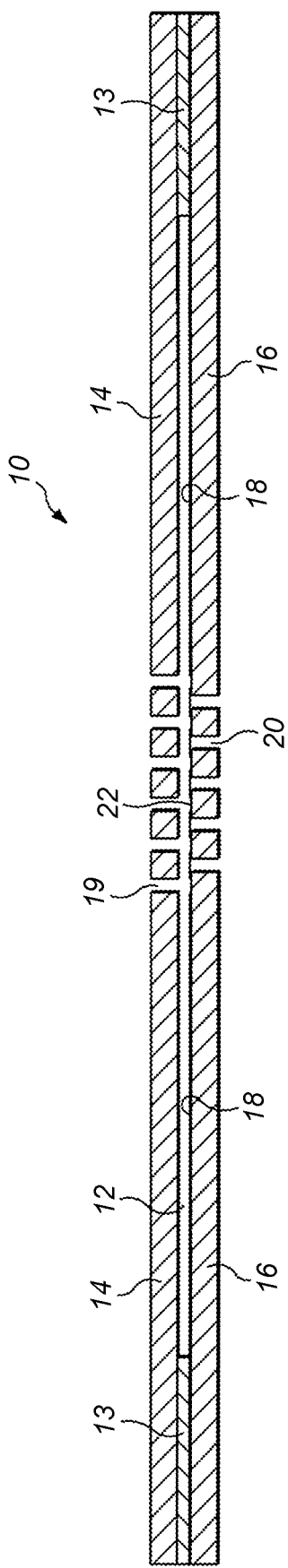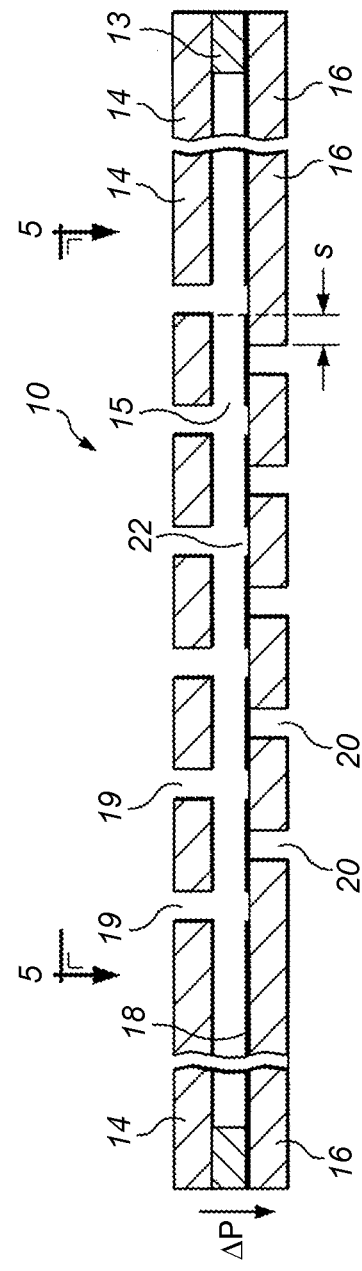
FIG. 1A
FIG. 1B

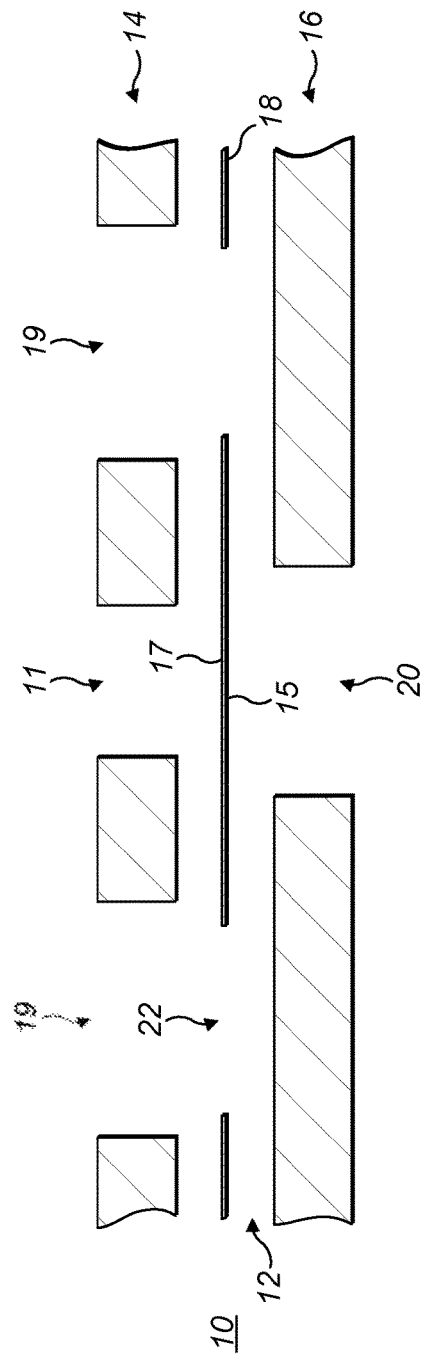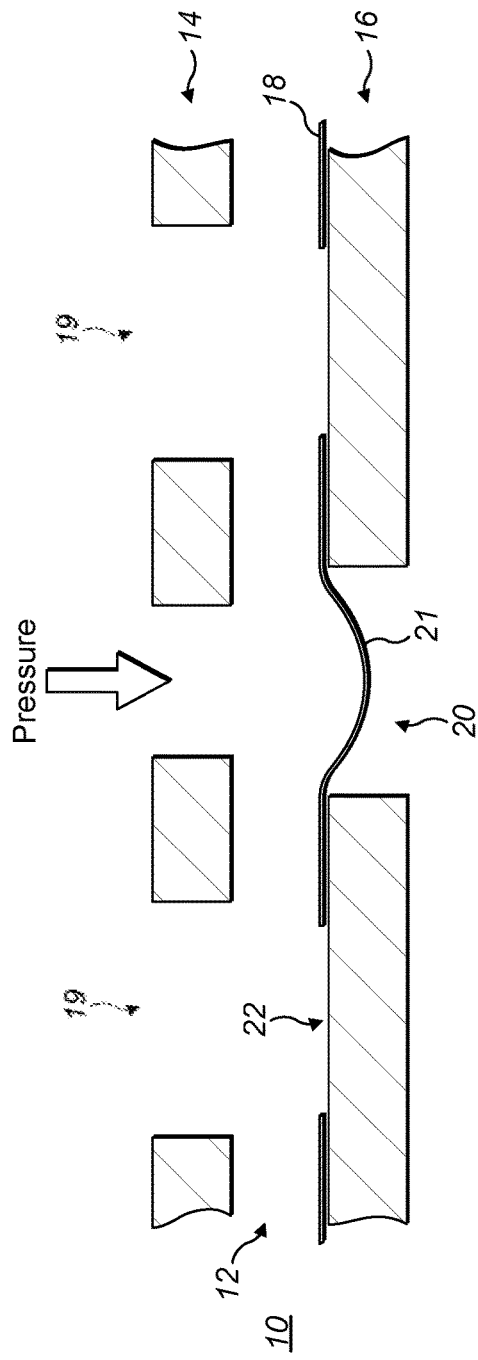

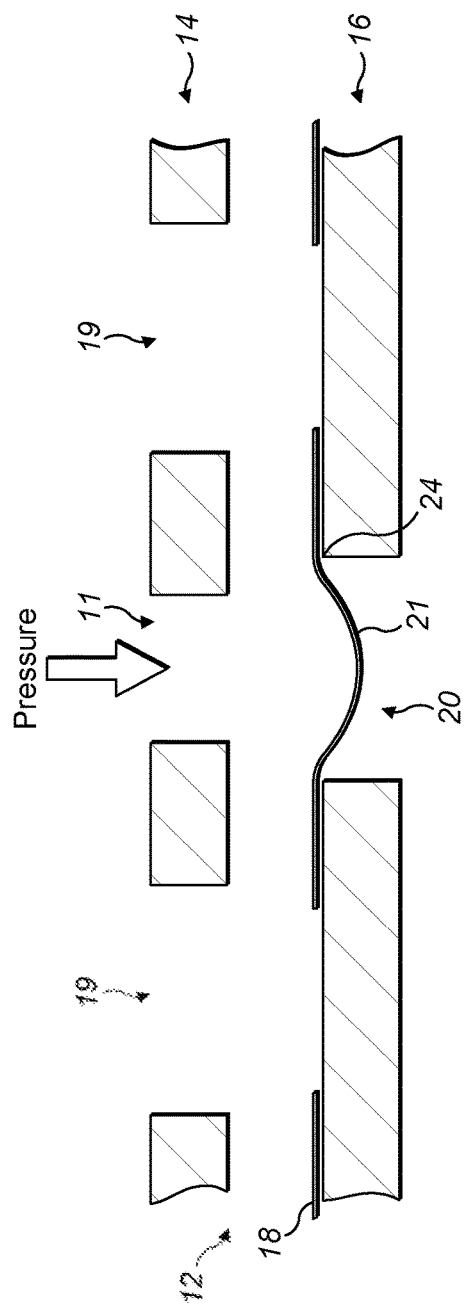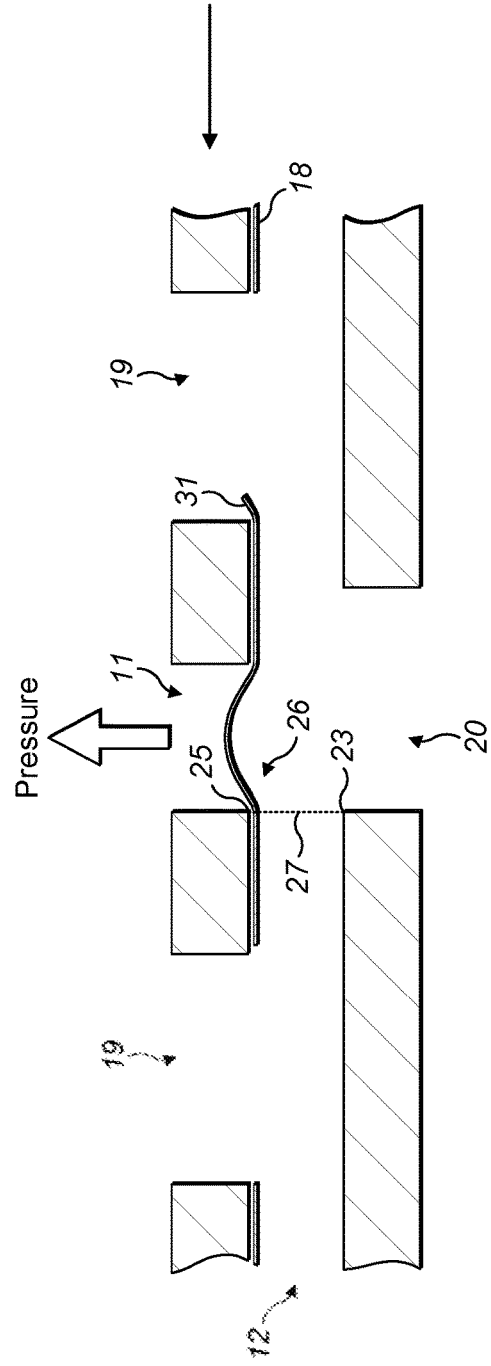

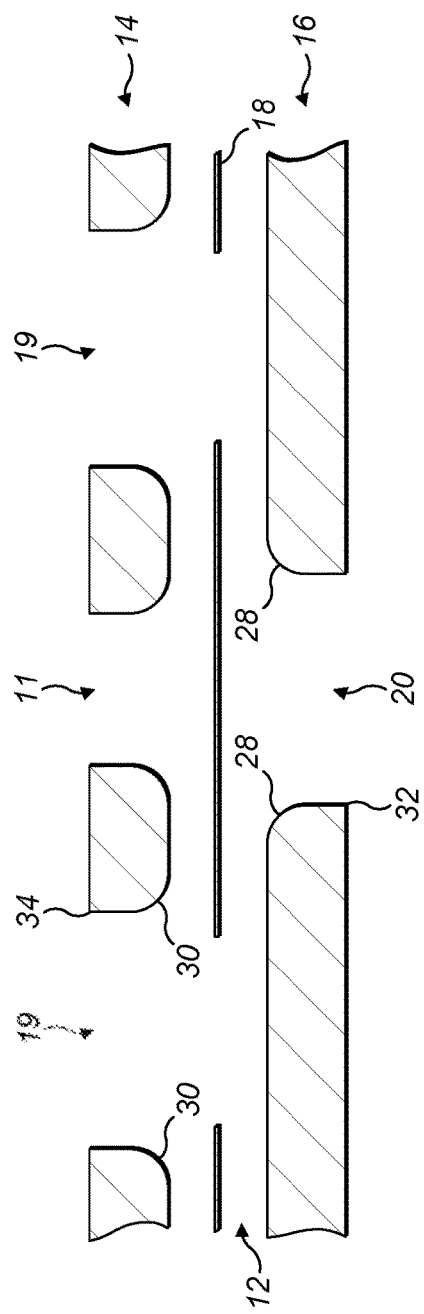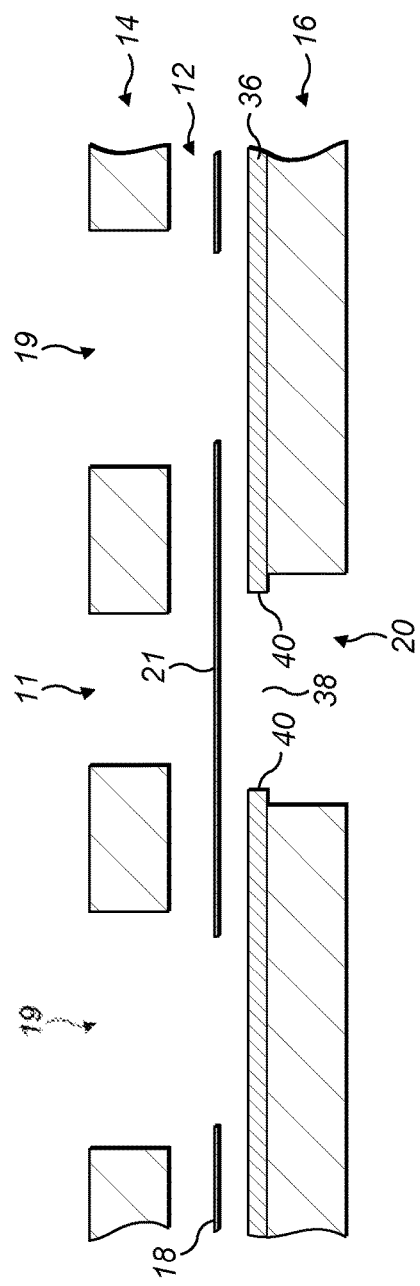

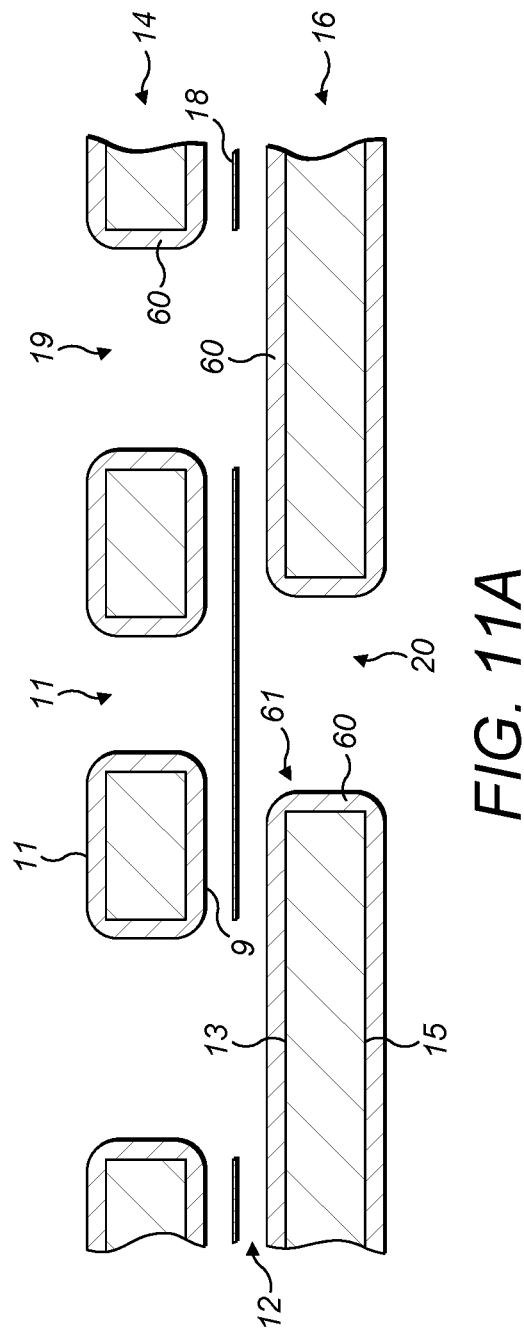
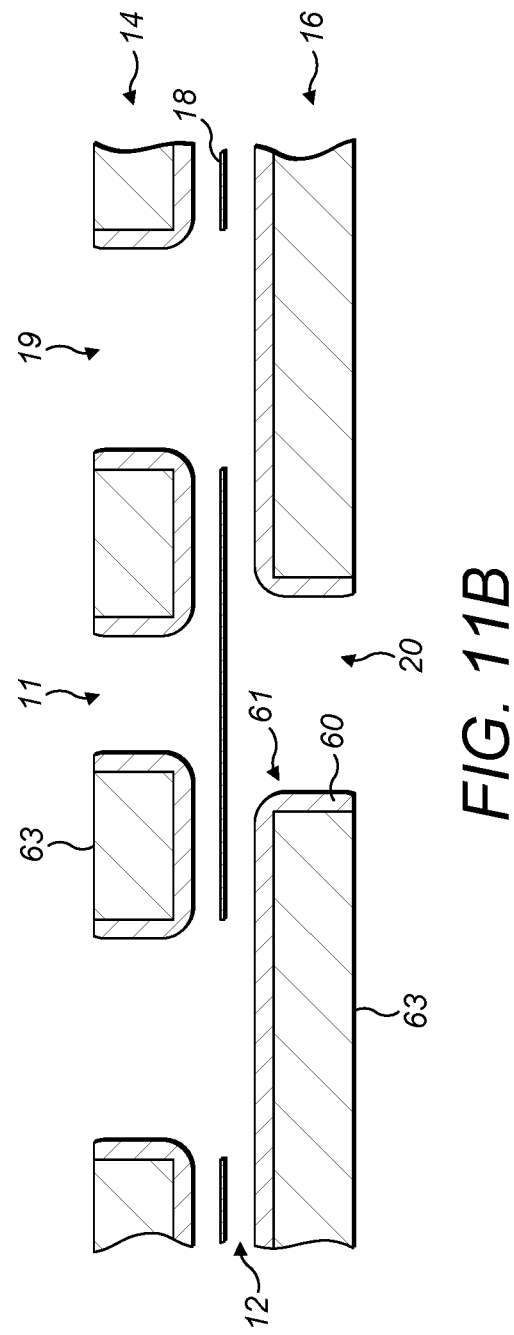
FIG. 11A
FIG. 11B

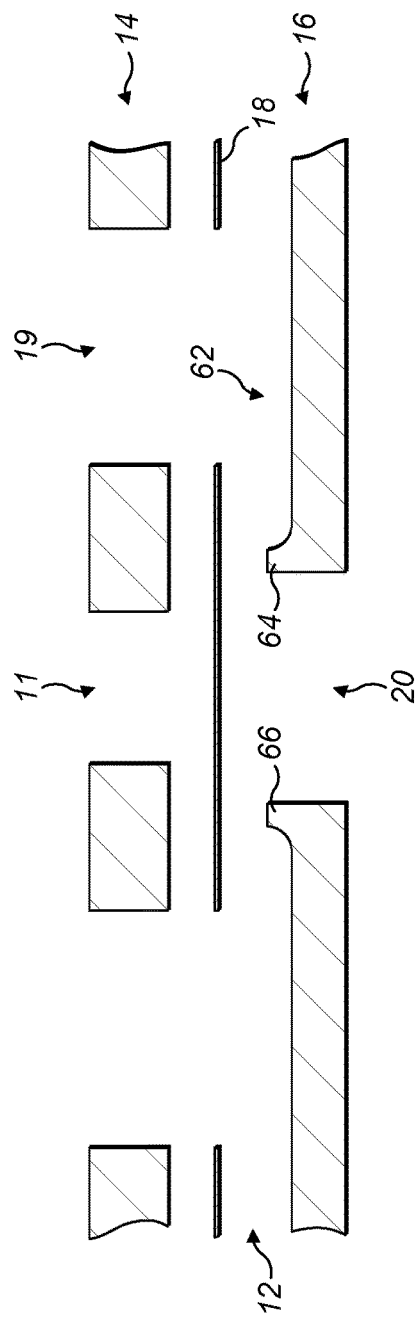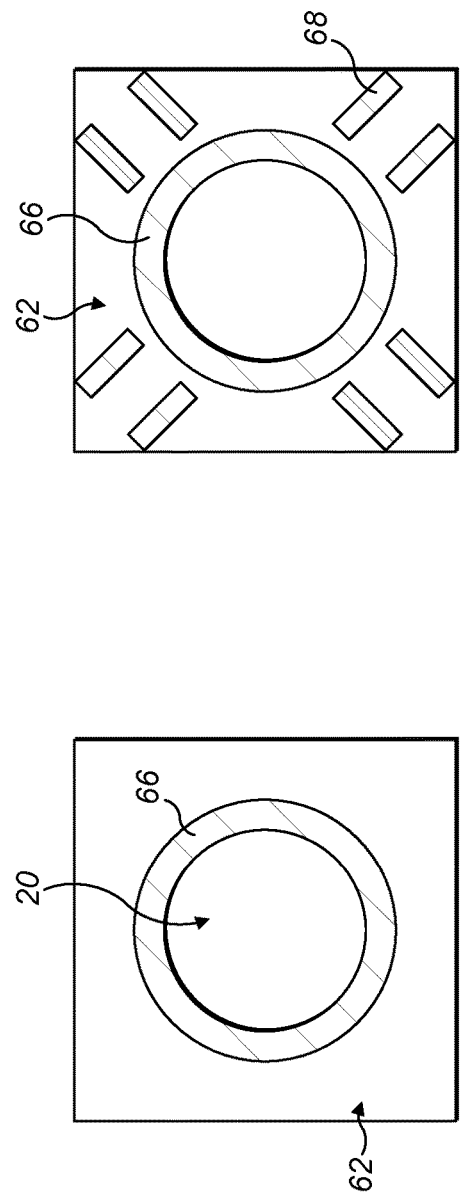

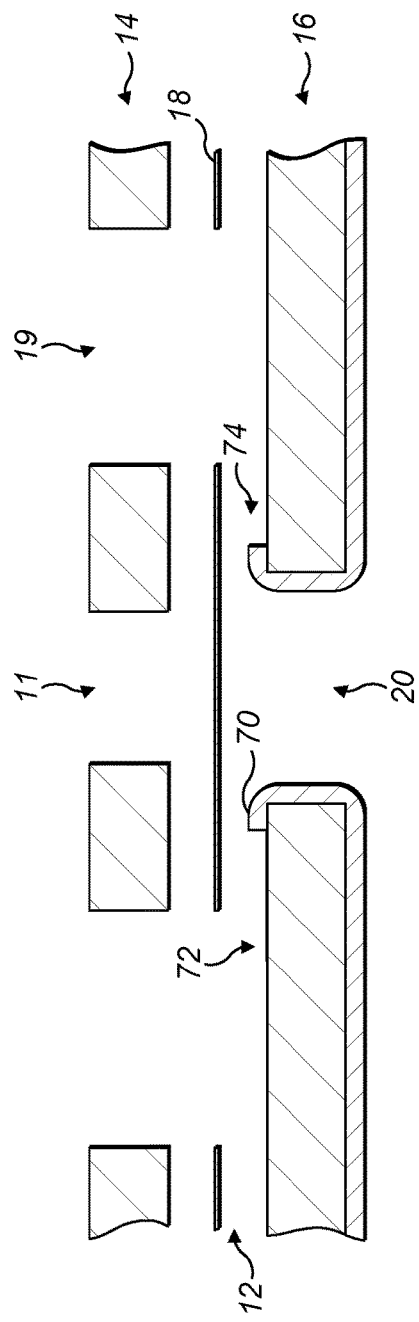
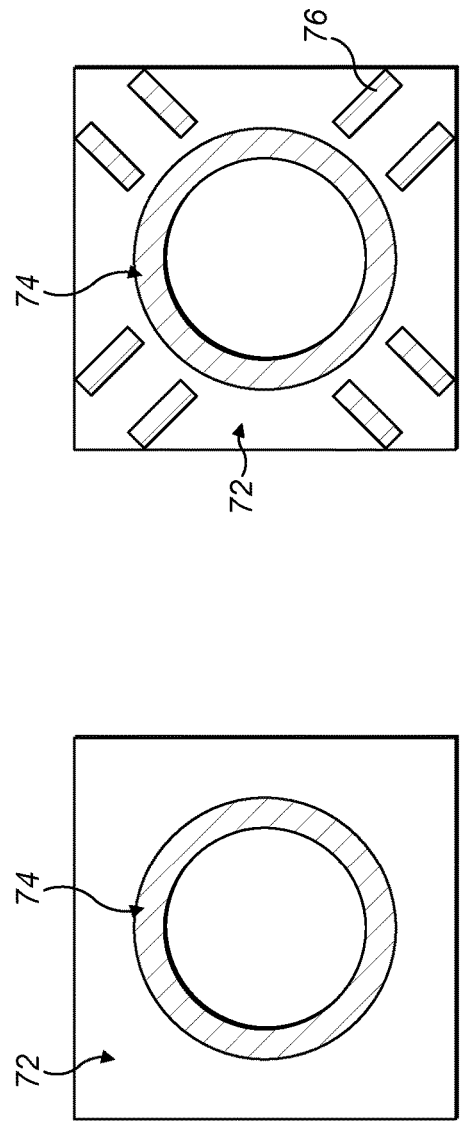
FIG. 13A
FIG. 13B
FIG. 13C

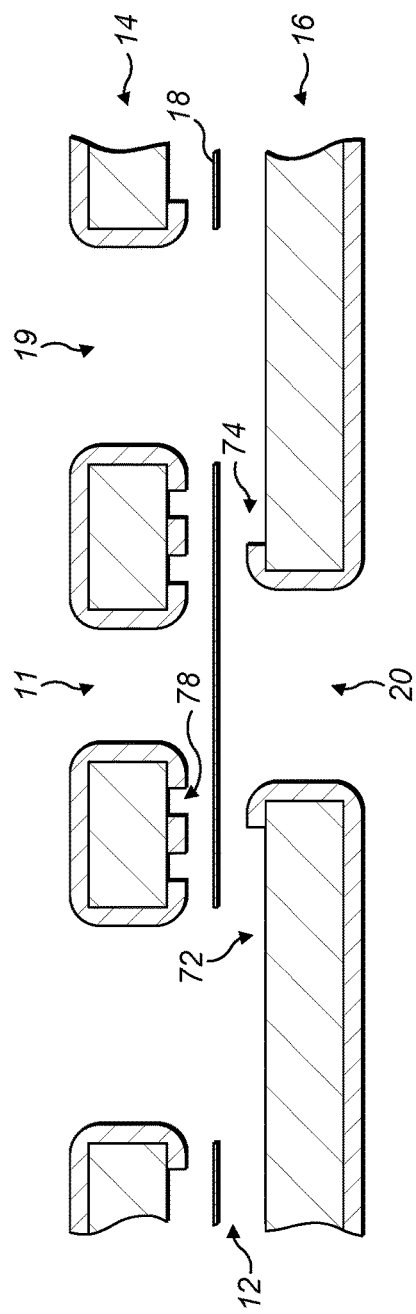
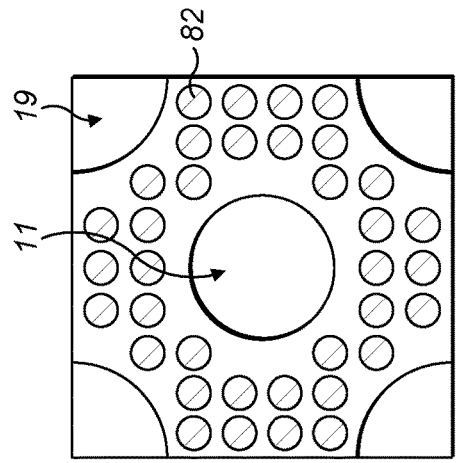
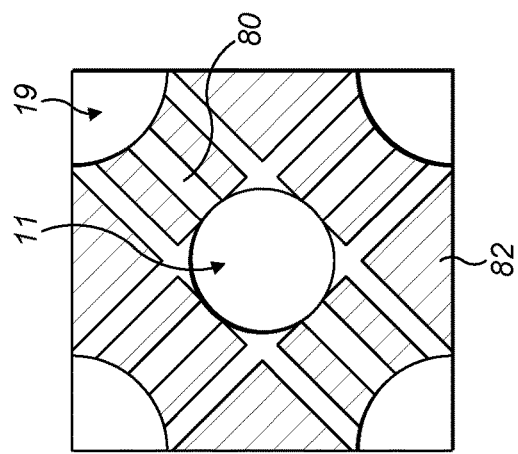

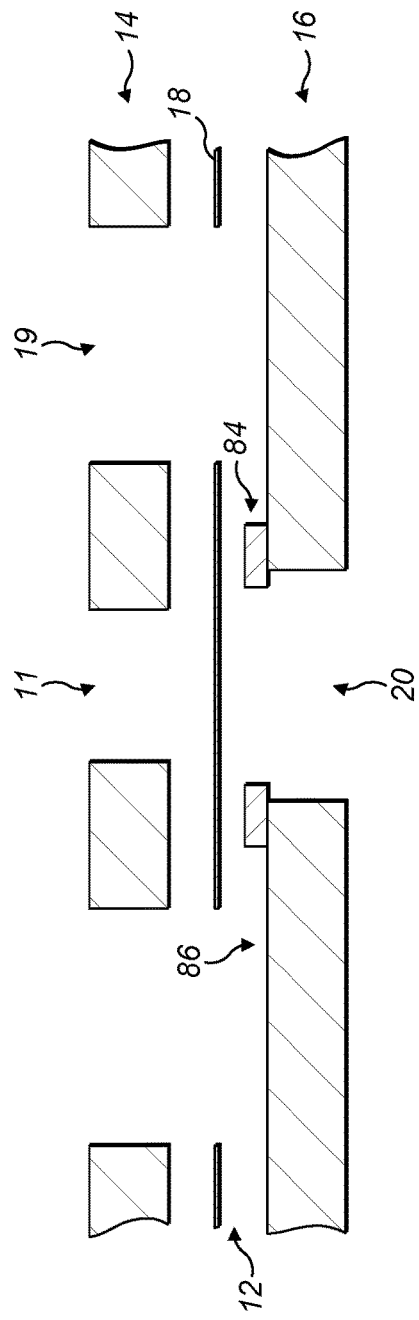
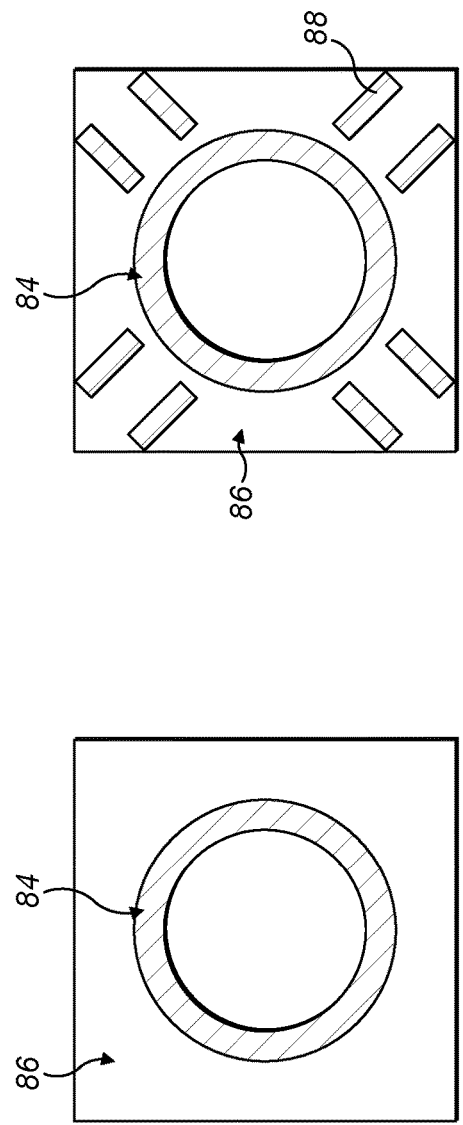
FIG. 15A
FIG. 15B
FIG. 15C

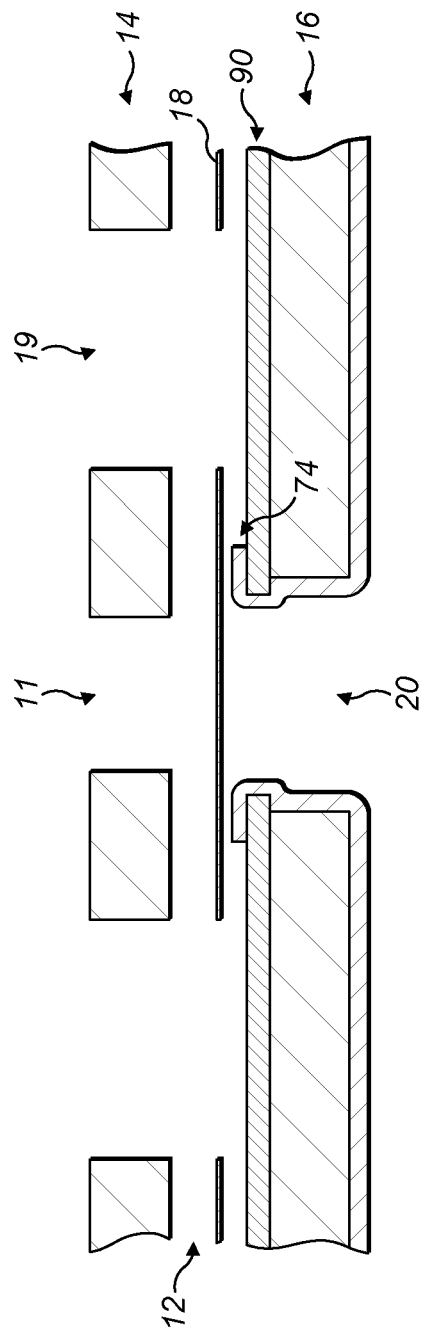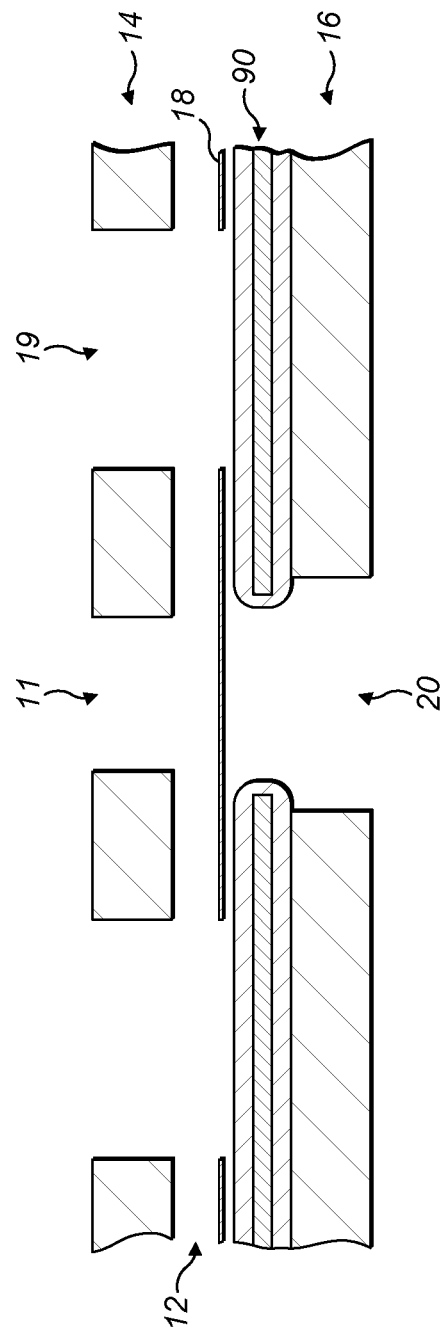

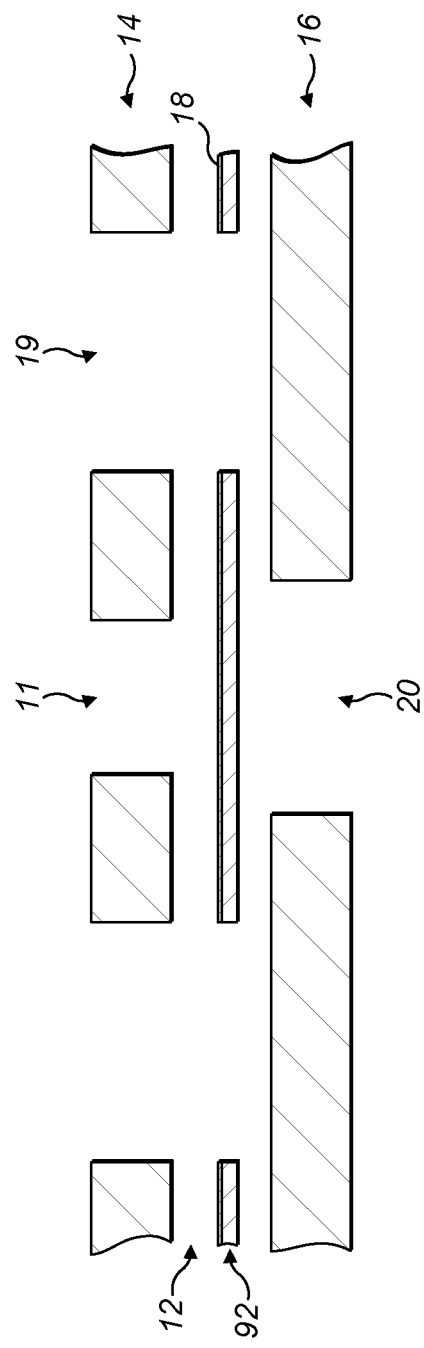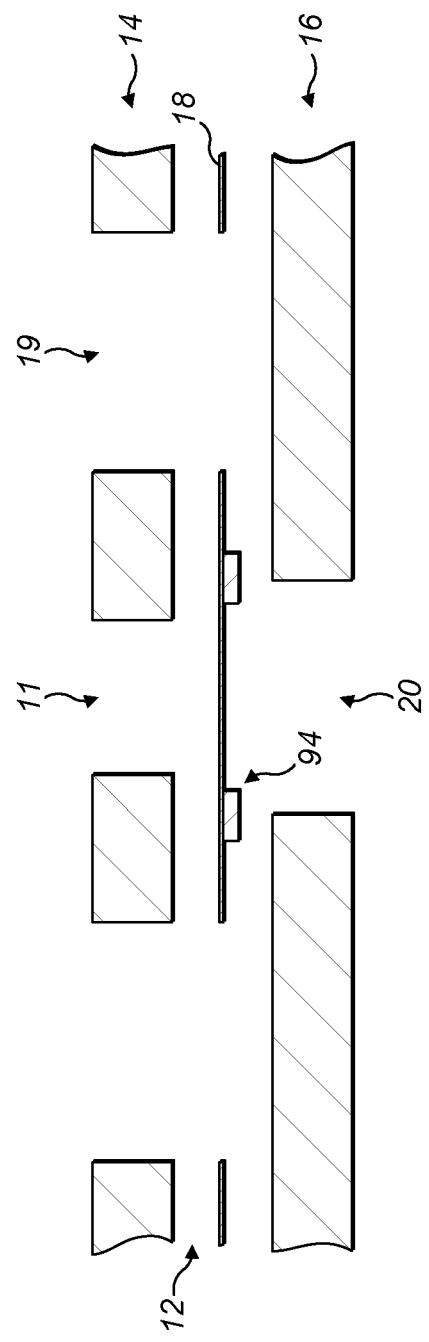

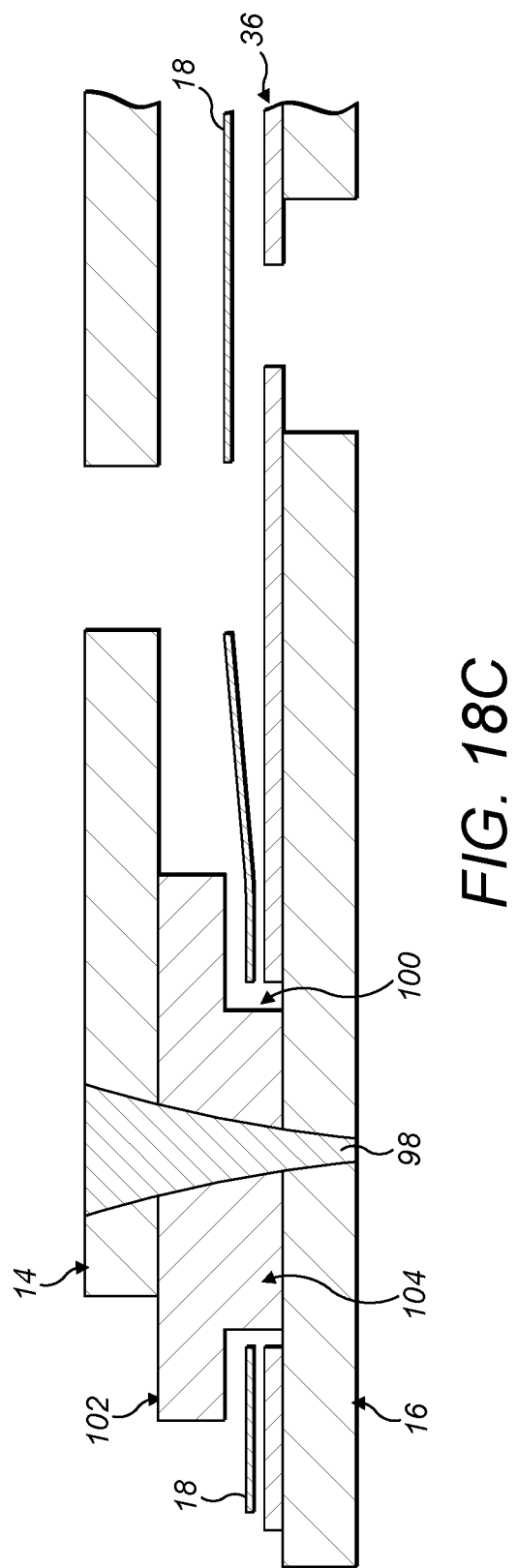

i)
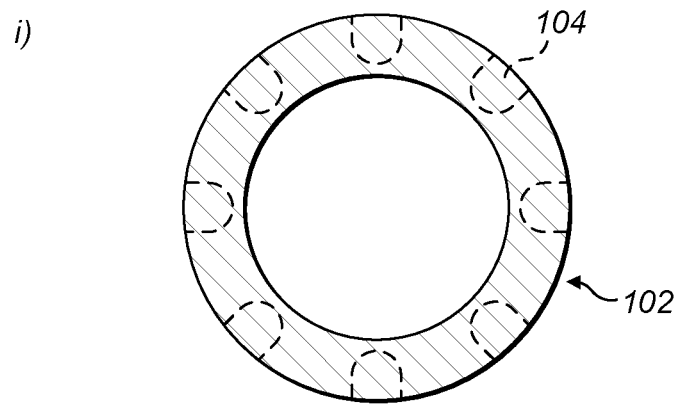
ii)
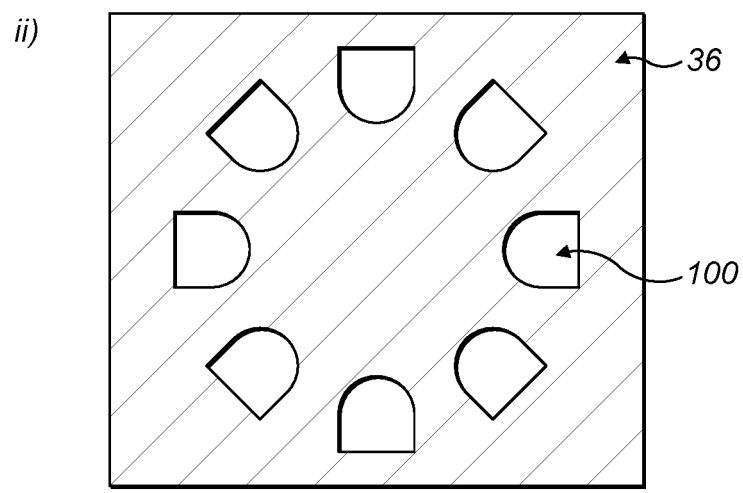
iii)
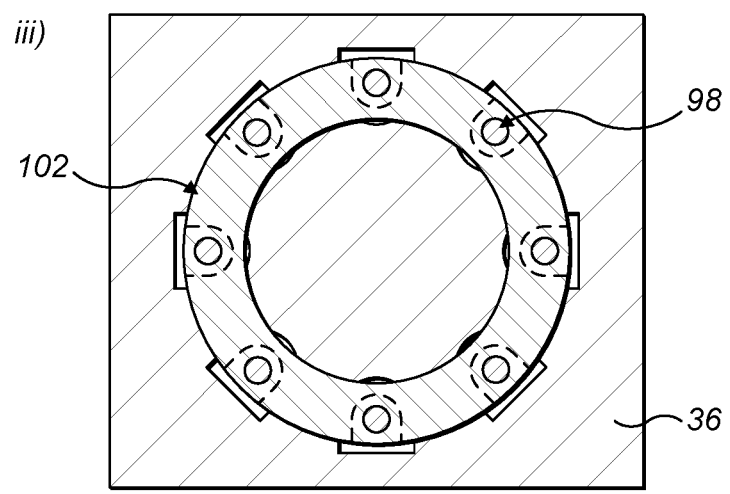
FIG. 18D i)
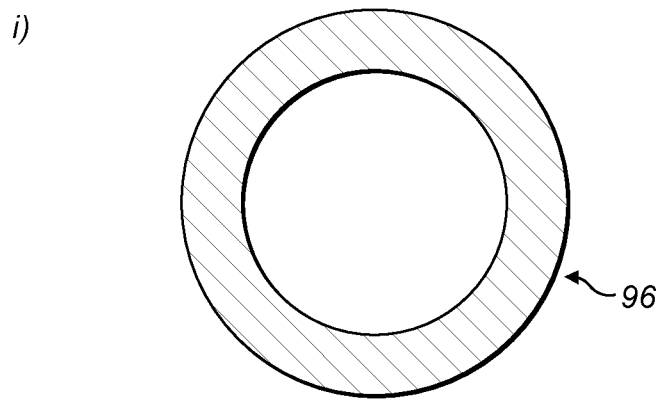
ii)
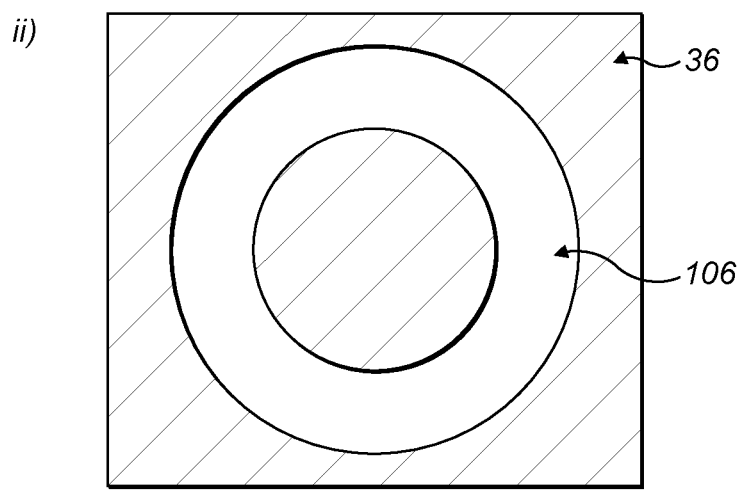
iii)
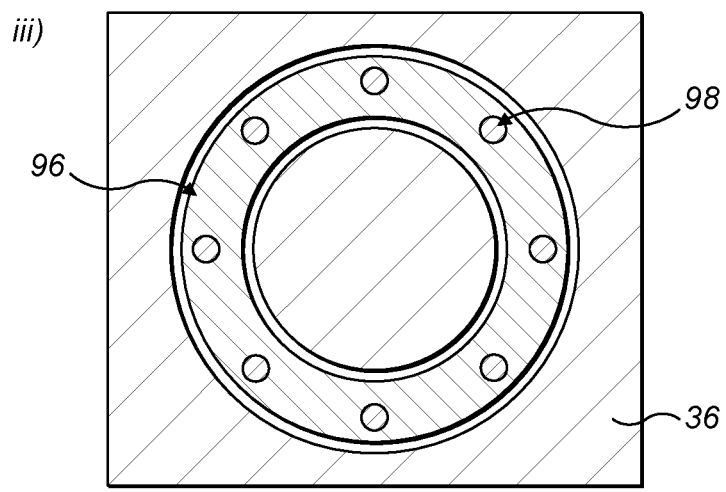
FIG. 18E

VALVE

CROSS-REFERENCE TO RELATED APPLICATIONS

This application is a U.S. national stage filing under 35 U.S.C. § 371 of International Application No. PCT/GB2019/053458, entitled "Improved Valve," filed Dec. 6, 2019, which claims priority to GB Application No. 1820025.3, entitled "Improved valve," filed Dec. 7, 2018, each of which are incorporated herein by reference in their entirety for all purposes.

FIELD OF THE INVENTION

The illustrative embodiments relate generally to a valve for controlling fluid flow there through and, more specifically, to an improved valve having a flap that is disposed between two plates and capable of movement between an open and closed position.

BACKGROUND

Many portable electronic devices, including medical devices, require pumps for delivering a positive pressure or providing a vacuum that are relatively small in size, and it is advantageous for such pumps to be inaudible in operation so as to provide discrete operation. To achieve the desired objectives of small size, high efficiency, and inaudible operation, such pumps must operate at very high frequencies, in turn requiring valves that must operate at very high frequencies to be effective, typically of around 20 kHz and higher.

To operate at these high frequencies, the valve must be responsive to a high frequency oscillating pressure that can be rectified to create a net flow of fluid through the pump. One such valve that is suitable for operating at frequencies of 20 kHz, and higher, is described in international patent publication WO 2010/139917, the entire contents of which are herein incorporated by reference.

Valve design may be optimised to minimise flow restriction, and to maximise valve response time and longevity. To achieve this, however, several compromises may need to be made. One such compromise relates to the valve flap thickness. A thick valve flap will have high robustness but slow valve response, and conversely a thin valve flap will have a relatively low robustness but fast valve response. Another compromise relates to valve aperture size. Small valve apertures are desirable for reducing valve fatigue; however, fabricating small apertures by chemical etching requires a thin valve plate, which can lead to problems with valve stiffness and significant deflection or vibrations caused by the pump pressure. A further problem with etching apertures is that they often result in sharp corners and rough edges, which can cause the valve flap to wear away when it impacts or contacts the valve plate at the edge of the aperture, especially if a relatively thin valve flap has been chosen for fast valve response. Fabrication of smaller apertures by alternative approaches, such as electroforming or laser machining, could potentially reduce the impact of the sharp edges, but such processes can be slow and expensive.

To achieve high performance and long lifetime, valves are required that can operate for 1000 s hours of continuous operation. Even with careful valve design within the above mentioned constraints, it is not uncommon for valves to fail after approximately $10^{11}$ cycles, often due to failure of the valve flap.

The present invention therefore aims to provide an improved, more robust valve that mitigates these issues.

SUMMARY OF THE PRESENT INVENTION

Described herein is a valve for controlling fluid flow, the valve comprising: a first plate comprising a plurality of first apertures extending generally perpendicular through said first plate; a second plate comprising a plurality of second apertures extending generally perpendicular through said second plate, the second apertures being substantially offset from the first apertures of said first plate; a spacer disposed between said first plate and said second plate to form a cavity therebetween in fluid communication with the first apertures of said first plate and the second apertures of said second plate; a flap disposed and moveable between said first plate and said second plate, said flap having apertures substantially offset from the first apertures of said first plate and substantially aligned with the second apertures of said second plate; wherein said flap is operable to be motivated between said first and second plates in response to a change in direction of the differential pressure of the fluid across the valve; and wherein at least one of said first plate or said second plate (and/or, optionally, said flap itself) comprises one or more features arranged to control the distribution of one or more forces asserted on said flap when said flap impacts or is in contact with said first plate or second plate, preferably by controlling the areas of the flap over which said one or more forces are asserted to inhibit wear of said flap at said areas.

The one or more forces (or "force") asserted on the valve flap may be force asserted on the flap by the fluid in response to a change in direction of the differential pressure of the fluid across the valve. Alternatively, or additionally, the first plate or second plate may apply a force to the valve flap when it impacts thereon or contacts therewith. Thus, said force may comprise one or more forces asserted on (or applied to) the flap in one or more directions by one or more aspects of the valve.

By controlling the distribution of force asserted on the valve flap, the present invention may advantageously reduce the force(s) asserted on said flap at any particular location (e.g. area or region) on the flap compared to the force(s) that would be asserted on the flap at that same location when impacting or in contact with a valve plate absent such features. Ideally, the one or more features help to reduce, or minimise and/or inhibit wear and fatigue of the flap by reducing the rate of deceleration of the flap when it contacts the first plate or second plate, which reduces the force experienced by the flap, thereby prolonging the lifespan of the flap, and hence the valve.

Preferably, said one or more features are arranged to control the maximum stress experienced in said valve flap (e.g. areas or regions of said flap), for example whereby to prolong the lifespan of the flap. Preferably, the stress (a) may be defined as the force (F) asserted (or applied) per unit area (A) of the flap.

The stress may be tensile stress caused by sections of the flap on either side of a stress plane being pulled apart or elongated, in use. Areas (or regions) of the flap that impact or come into contact with edge (e.g. "impact") regions of the apertures in the first and/or second plates may define the stress plane(s), for example, at regions on the flap where unsupported portions (or "spans") of the flap enter the apertures on a plate upon impact with said first or second plates. The stress may also be "fatigue" stress due to cyclic application of stress on the flap during use, for example at the high frequencies of operation for which the valve may be used.

The areas of the flap over which said forces are asserted are preferably areas of the flap that impact or contact regions of said first or second plate adjacent said first apertures or said second apertures. The regions of said first or second plate are preferably edges of said first apertures or said second apertures.

The one or more features may also reduce unsupported span of the flap, which reduces the stress in the flap. The one or more features may also result in reduced flow restrictions thought the valve structure which may increase the valve performance.

The one or more features may comprise a coating that extends at least partially across an internal surface of at least one of the first and second plate, and preferably extends at least partially into the apertures of said plate to cover at least part of an internal surface of said apertures, whereby to round off or smooth out the edges of the apertures. The coating may extend at least partially across an external surface of the plate.

The valve may further comprise a further coating that extends at least partially across an internal surface of the other of said first or second plate, and preferably extends at least partially into the apertures of said other plate to at least partially cover an internal surface of said apertures. The further coating may extend at least partially across an external surface of the second plate.

The coating or further coating has a thickness that is equal to less than half the diameter of said first or second apertures on said first or second plate on which said coating is applied.

The one or more features may comprise a substantially curved surface of said first or second plate. The curved surface may form at least part of an edge that defines the first or second set of apertures such that the apertures do not exhibit any sharp corners. The substantially curved surface may form at least part of an inner edge that defines the aperture, an inner edge being an edge of the aperture closest to the flap. The inner edge may be considered to be located within the valve structure. The substantially curved surface may form at least part of an outer edge that defines the aperture, an outer edge being an edge of the aperture furthest away from the flap. The outer edge may be considered to be located outside of the valve structure. Both the first and the second plate may comprise a substantially curved surface. The substantially curved surface may be located on an inner edge of the first set of apertures and the second set of apertures.

The one or more features may comprise a (first) support layer disposed between the flap and the first or second plate. The support layer may be attached to the plate. The support layer may comprise at least one aperture. The support layer may have at least one aperture that is substantially aligned with the apertures on the plate. The diameter of the at least one aperture of the support layer may be less than the diameter of the apertures in the plate. The support layer may be attached to either the first plate or the second plate.

The one or more features may comprise a (second) further support layer disposed between the flap and the other of said first and second plates. The further support layer may be attached to the other plate. The further support layer may have at least one aperture. The diameter of the at least one aperture in the further support layer may be less than the diameter of the aperture of said (first) support layer.

The valve may comprise two support layers. One support layer may be attached to the first plate and another support layer may be attached to the second plate. Both the first and the second support layers may be attached to the inner surfaces of both the first and second plate.

The one or more features may comprise at least one region of increased height on a surface of the first plate, said at least one region being of increased height with respect to the rest of the surface of the first plate.

The at least one region of increased height may form part of an edge of an aperture in the first set of apertures. The at least one region of increased height may be on an inner surface of the first plate.

The at least one region of increased height may be formed via a recess in the surrounding surface of the first plate. The at least one region of increased height may be formed via a coating, which may partially extend across an inner surface of the first plate. The at least one region of increased height may be formed via a raised support layer disposed on the surface of the first plate.

A coating layer may at least partially cover the raised support layer. The coating layer may completely cover the support layer. The coating layer may extend into the apertures in the first plate and may at least partially cover an internal surface of the apertures.

The flap may comprise a flap coating which may at least partially extend across a surface of the flap. The flap coating may be arranged to contact either said first plate or said second plate when the flap is moved towards said respective first or second plate.

The first plate and the said second plate may both comprise said one or more features.

In a preferred embodiment, the valve may be suitable for operating at frequencies of 20 kHz or higher. The diameter of the plurality of first and/or second apertures extending through the first and/or second plates may be less than 500 μm. Preferably, the diameter of said apertures is less than 200 μm; more preferably, the diameter of said apertures is less than 150 μm. In some embodiments, the plurality of first and/or second apertures extending through the first and/or second plates may have a diameter in the range 130-140 μm. In other embodiments said apertures may have a diameter of 100 μm.

The valve flap may have a thickness of less than 45 μm. Preferably, the valve flap has a thickness of less than 10 μm; more preferably, the valve flap has a thickness of less than 5 μm. In some embodiments the valve flap may have a thickness in the range 2-3 μm. In other embodiments, the valve flap may have a thickness of 1.4 μm. Preferably, the mass per unit area of the valve flap is less than 60 g/m$^2$.

Any apparatus feature described herein may be provided as a method feature, and vice versa. Furthermore, any feature in a particular aspect or embodiment described herein may be applied to another aspect, in any appropriate combination. It should also be appreciated that particular combinations of the various features described and defined in any aspects described herein can be implemented and/or supplied and/or used independently.

BRIEF DESCRIPTION OF THE DRAWINGS

Aspects and embodiments of the present invention will now be described, by way of example only, with reference to the accompanying drawings, in which:

FIG. 1A shows a schematic cross-section view of an illustrative embodiment of a valve in a closed position; FIG. 1B shows an exploded, sectional view of the valve of FIG. 1A taken along line 1B-1B in FIG. 5;

FIG. 6A shows a schematic cross-section view of a valve in a neutral open position; FIG. 6B shows a schematic cross-section view of a valve in a closed position.

FIG. 7A shows a schematic cross-section view of points of failure of a valve when the valve is in a closed position; FIG. 7B shows a schematic cross-section view of points of failure of a valve when the valve is in an open position and the valve plates are misaligned;

FIG. 8 shows a schematic cross-section view of a valve with rounded corners;

FIG. 9A shows a schematic cross-section view of a valve with a support layer.

FIG. 11A shows a schematic cross-section view of a valve with a coating; FIG. 11B shows a schematic cross-section view of a valve with an alternative coating;

FIG. 12A shows a schematic cross-section view of a valve with a recess; FIGS. 12B and 12C show top-down views of valve recesses;

FIG. 13A shows a schematic cross-section view of a valve with a raised sealing edge; FIGS. 13B and 13C show top-down views of raised sealing edges;

FIG. 14A shows a schematic cross-section view of a valve with a raised sealing edge and additional release structures; FIGS. 14B to 14C show bottom-up views of different release structures;

FIG. 15A shows a schematic cross-section view of a valve with a raised sealing edge; FIGS. 15B to 15C show top-down views of raised sealing edges;

FIG. 16A shows a schematic cross-section view of a valve with a support layer and a raised sealing edge; FIG. 16B shows a schematic cross-section view of a valve with a support layer and a coating;

FIGS. 17A and 17B show a schematic cross-section view of a valve with a reinforced valve flap; and FIGS. 18A to 18C show schematic cross-section views of a valve with a shim plate; FIGS. 18D and 18E show top-down views of different shim plates.

SPECIFIC DESCRIPTION

Figure 2:
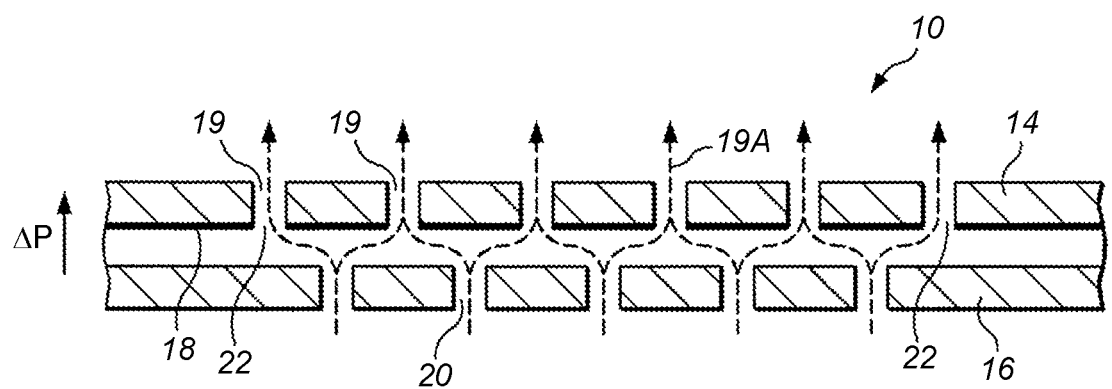
FIG. 2 shows a schematic cross-section view of the valve in FIG. 1B in an open position while fluid flows therethrough.

In the following detailed description of several illustrative embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

In the following description and accompanying drawings, corresponding features of different embodiments are, preferably, identified using corresponding reference numerals.

A valve 10, such as one generally taught in WO 2010/139917, is shown in FIGS. 1 to 5. The valve 10 comprises a substantially cylindrical wall 13 that is ring-shaped (e.g. annular) closed at one end by a first plate 16 (e.g. a "sealing" plate) and at the other end by a second plate 14 (e.g. a "retention" or "open" plate) such that the first plate 16 and second plate 14 are spaced apart by the ring-shaped wall 13. The inner surfaces of the ring-shaped wall 13 and the two plates 14, 16 form a cavity 12 within the valve 10 in which is disposed a substantially circular (valve) flap 18, which is movable between the two plates 14, 16. In FIGS. 1A and 1B, the flap 18 is shown adjacent the first plate 16, but the flap 18 may alternatively be disposed adjacent the second plate 14 in an alternative embodiment, and in this sense the flap 18 is considered to be "biased" against either one of the first plate 16 or second plate 14.

The peripheral portion of the flap 18 is sandwiched between the first plate 16 and the ring-shaped wall 13 so that the motion of the flap 18 is restrained in the plane substantially perpendicular the surface of the flap 18. The motion of the flap 18 in such plane may also be restrained by the peripheral portion of the flap 18 being attached directly to either the first plate 16 or the ring-shaped wall 13, or by the flap 18 being a close fit within the ring-shaped wall 13, in alternative embodiments. The remainder of the flap 18 is sufficiently flexible and movable in a direction substantially perpendicular the surface of the flap 18, so that a force applied to either surface of the flap 18 will motivate the flap 18 between the first plate 16 and the second plate 14 as shown in FIG. 1B, FIG. 2 and FIG. 3.

Figure 3:
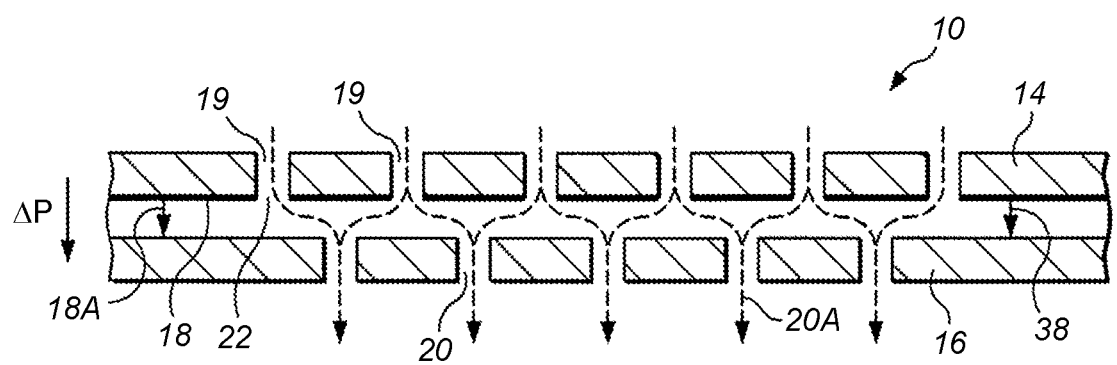
FIG. 3 shows a schematic cross-section view of the valve in FIG. 1B in transition between the open and closed positions.
Figure 4:
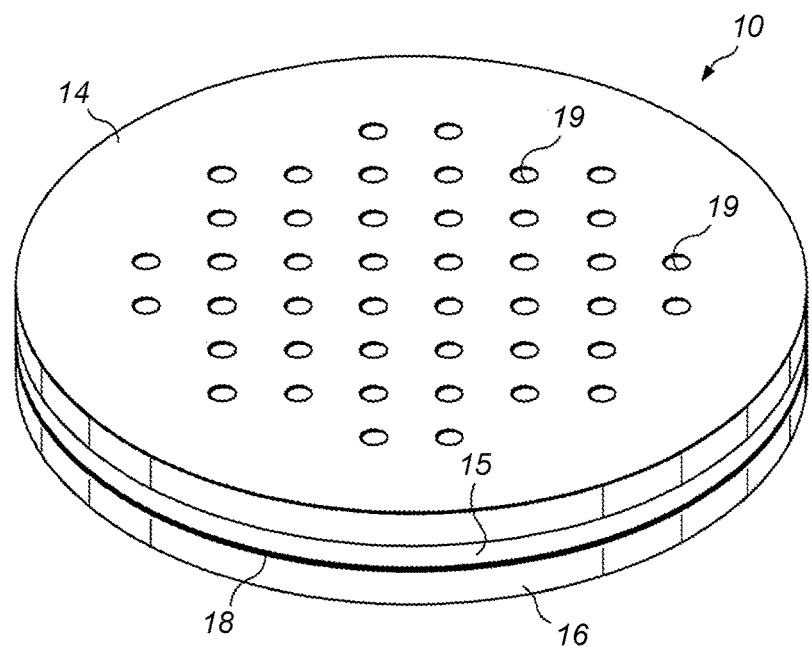
FIG. 4 shows a schematic perspective view of the valve of FIG. 1B.
Figure 5:
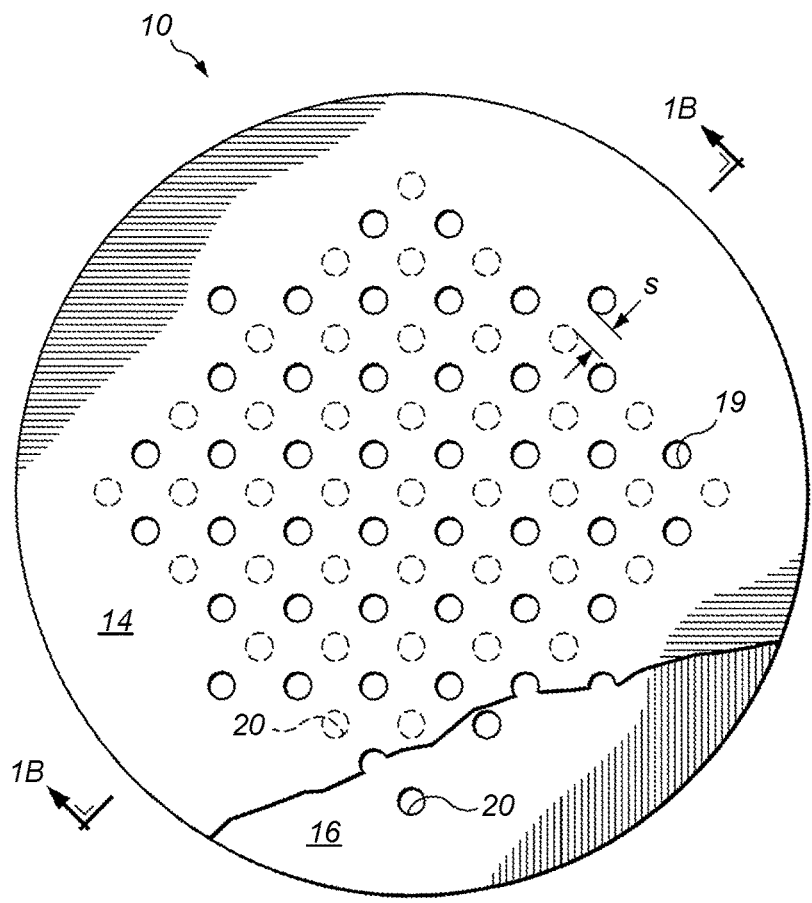
FIG. 5 shows a schematic top view of the valve of FIG. 1B.

Each of the first plate 16 and second plate 14 has a plurality of apertures (or holes) 20, 19 respectively, which extend through each plate 16, 14, as shown in the cross-sectional views of FIGS. 1 to 3. The apertures 19, 20 in the respective plates 14, 16 are offset from each other such that none of the apertures 19 of the second plate 14 align with the apertures 20 of the first plate 16. The flap 18 also has a plurality of apertures (or holes) 22, which are generally aligned with the apertures 19 of the second plate 14 to provide a passage through which fluid, including a gas or liquid, may flow as indicated by the dashed arrows 24 in FIG. 2. Although the apertures 19, 20, 22 are shown to be of substantially uniform size and shape, they may be of different diameters or even different shapes. In this illustrative embodiment of a valve 10, the apertures 19, 20 form an alternating pattern across the surface of their respective plates 14, 16, as shown by the solid and dashed circles, respectively, in FIGS. 4 and 5. The pattern of apertures 19, 20, 22 may be designed to increase or decrease the number of holes to control the total flow of fluid through the valve 10 as required. For example, the number of apertures 19, 20, 22 may be increased to reduce the flow resistance of the valve 10. The functioning of the individual pairings of holes 19, 20, 22 is illustrated by individual sets of dashed arrows 24, 32 in FIG. 2 and FIG. 3.

In use, the flap 18 is motivated between the plates 14, 16 in response to a change in direction of the differential pressure of fluid across the valve 10, which thereby effectively controls the flow of fluid through the valve 10.

When no force is applied to either surface of the flap 18 to overcome the bias of the flap 18, the valve 10 is in a "normally closed" position because the flap 18 is biased against the first plate 16 and the apertures 22 of the flap 18 are offset or not aligned with the apertures 19 of the second plate 16. In this "normally closed" position, the flow of fluid through the first plate 16 is substantially blocked or covered by the non-perforated portions of the flap 18, as shown in FIG. 1B.

When pressure is applied against either side of the flap 18 that overcomes the bias of the flap 18 and motivates it away from the first plate 16 towards the second plate 14, as shown in FIG. 2, the valve 10 moves from the normally "closed" position to an "open" position to allow fluid to flow in the direction indicated by the dashed arrows 19A. When the pressure changes direction, the flap 18 will be motivated back towards the first plate 16 to the normally closed position, to which it is biased. If the pressure changes direction, fluid will flow for a short time period in the opposite direction as indicated by the dashed arrows 20A, shown in FIG. 3, until the flap 18 seals the apertures 20 of the first plate 16 substantially to block fluid flow through the first plate 16 as shown in FIG. 1B.

In another embodiment of the valve 10, the flap 18 may be biased against the second plate 14 with the apertures 19, 22 aligned in a "normally open" position. In this embodiment, applying a positive pressure against the flap 18 will motivate it into a "closed" position.

In more detail, the operation of the valve 10 is a function of the change in direction of the differential pressure ($\Delta P$) of the fluid across the valve 10. In FIG. 1B, the differential pressure has been assigned a negative value ($-\Delta P$) as indicated by the downward pointing arrow. In this embodiment, when the differential pressure has a negative value ($-\Delta P$), the fluid pressure on the second plate 14 side of the valve 10 is greater than the fluid pressure on the first plate 16 side of the valve 10. This negative differential pressure ($-\Delta P$) drives the flap 18 into the fully closed position, as described above, wherein the flap 18 is pressed against the first plate 16 substantially to block the apertures 20 in the first plate 16, thereby substantially preventing the flow of fluid through the valve 10.

When the differential pressure across the valve 10 reverses to become a positive differential pressure ($+\Delta P$) as indicated by the upward pointing arrow in FIG. 2, the flap 18 is motivated away from the first plate 16 and towards the second plate 14 into the open position. In this embodiment, when the differential pressure has a positive value ($+\Delta P$), the fluid pressure on the first plate 16 side of the valve 10 is greater than the fluid pressure on the second plate 14 side of the valve 10. In the open position, the movement of the flap 18 unblocks the apertures 20 of the first plate 16 so that fluid is able to flow through them and also through the aligned apertures 22 and 19 of the flap 18 and the second plate 14, respectively, as indicated by the dashed arrows 19A.

When the differential pressure across the valve 10 changes back to a negative differential pressure ($-\Delta P$) as indicated by the downward pointing arrow in FIG. 3, fluid begins flowing in the opposite direction through the valve 10 as indicated by the dashed arrows 20A, which forces the flap 18 back toward the closed position shown in FIG. 1B. In FIG. 3, the fluid pressure between the flap 18 and the first plate 16 is lower than the fluid pressure between the flap 18 and the second plate 14. Thus, the flap 18 experiences a net force, represented by arrow 18A in FIG. 3, which accelerates the flap 18 toward the first plate 16 to close the valve 10. In both closing and opening of the valve 10, the flap 18 will be in contact with the first plate 16 or second plate 14, respectively, under force asserted (or applied) on the flap 18 by the fluid (e.g. in response to a change in direction of the differential pressure). When being motivated between the first plate 16 and second plate 14, the flap 18 may impact (against or with) said first plate 16 or second plate 14 under force asserted (or applied) by the fluid.

In this manner, the changing differential pressure cycles the valve 10 between closed and open positions based on the direction (i.e. positive or negative) of the differential pressure across the valve 10. It will be understood that the flap 17 could alternatively be biased against the second plate 14 in an open position when no differential pressure is applied across the valve 10, such that the valve 10 would then be in a "normally open" position.

As noted previously, the terms "force asserted on" or "force applied to", as used herein preferably connote one or more forces caused by the (fluid) pressure differential across the valve 10. Other forces may be asserted on, or applied to, the flap 18, for example the plates 14, 16 may assert a reactive force on the flap 18 when it impacts on or is in contact therewith. It should also be noted that the terms "sealed" and "blocked", as used herein, in relation to valve operation are intended to include cases in which substantial (but incomplete) sealing or blockage occurs, such that the flow resistance of the valve is greater in the "closed" position than in the "open" position.

A close-up cross-section of the valve 10 is shown in FIG. 6A. As described above, both the first (e.g. "sealing") plate 16 and the second (e.g. "retention" or "open") plate 14 have a number of holes (or "apertures") 19, 20, which extend through each plate 14, 16. The flap 18 is shown in a neutral position between the plates 14, 16 with the flap 18 having a first ("upper"), surface 17 and a second ("lower") surface 15. The first and second surfaces 17, 15 are opposed, on either side of the flap, each facing towards a respective plate 14, 16.

At least one release hole 11 is also provided in the open plate 14 to help the valve flap 18 release from the open plate 14 when fluid pressure is asserted on the top surface 17 of the valve flap 18 (i.e. to help the flap 18 move from the open position to the closed position). The release hole 11 ensures that at least a portion of the valve flap 18 is exposed to the fluid pressure so that the flap 18 can be motivated between the open and closed positions. Without the release hole 11, there is a chance that no part of the valve flap 18 would be exposed to the fluid pressure because, in general, the holes 22 in the valve flap 18 are configured to align with the holes 19 in the open plate 14. That is, the release hole 11 ensures that there is at least one hole in the open plate 14 which is not aligned with a valve flap hole 22.

When a force, such as that caused by pressure differential across the valve 10, is asserted on the first surface 17 of the flap 18, the flap 18 is motivated towards the sealing plate 16. The valve 10 is then in a "closed" position because the flap 18 is held against the sealing plate 16 as a result of the force being asserted on it with the holes 22 of the flap 18 not aligned with the holes 20 of the sealing plate 16. In this "closed" position, the flow of fluid through the sealing plate 16 is substantially blocked or covered by the main body (i.e. the non-perforated portions) of the flap 18, as shown in FIG. 6B.

Figure 6C:
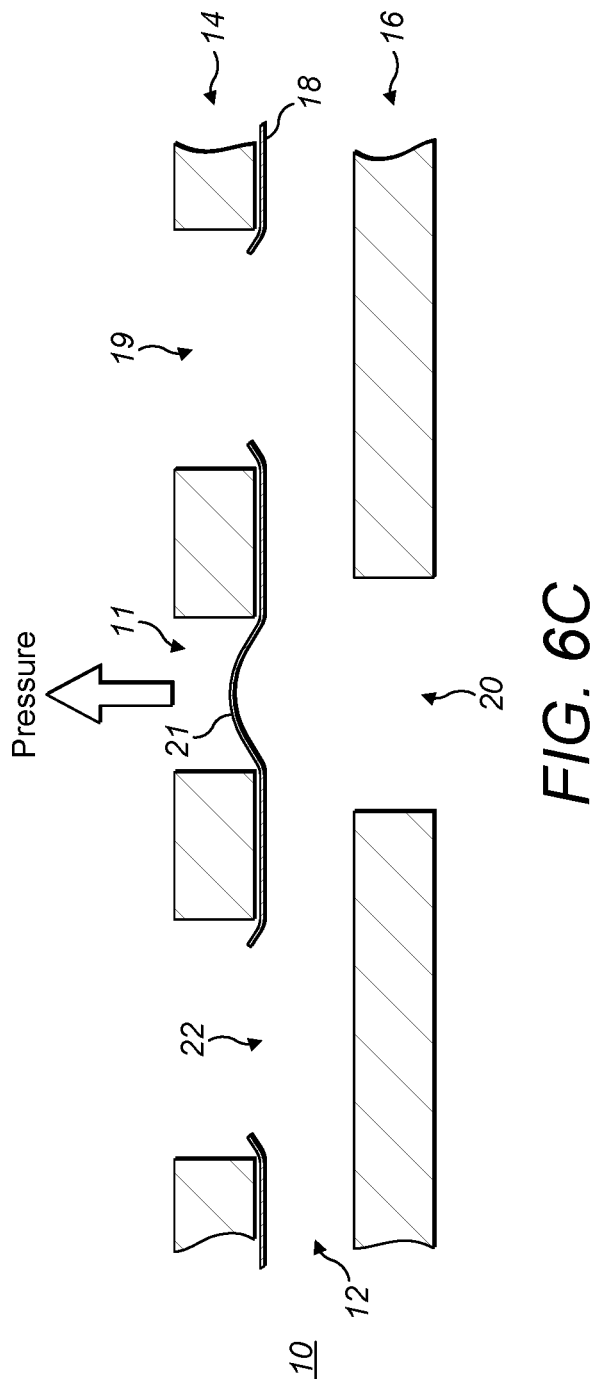
FIG. 6C shows a schematic cross-section view of a valve in an open position.

When a force is asserted against the second surface 15 of the flap 18, the flap 18 is motivated away from the sealing plate 16 towards the open plate 14, as shown in FIG. 6C. The valve 10 is now in an "open" position allowing fluid to flow through it via a fluid pathway formed between the sealing plate 16, the cavity 12, and the open plate 14.

As mentioned above, the valve flap 18 may further be biased towards either the open plate 14 or sealing plate 16.

Due to the flexible nature of the flap 18, when it is forced against either the open plate 14 or the sealing plate 16, span portions 21 of the flap 18 that are arranged to cover one or more holes 19, 20 in the plates 14, 16 will flex or distort under the pressure differential in the direction of the asserted force. For example, a span portion 21 of the flap 18, which covers the release hole 11 in the open plate 14 and one of the holes 20 in the sealing plate 16, when the flap is motivated between the two plates 14, 16, respectively, will flex into each of those holes 11, 20 when the flap 18 impacts or is in contact with the respective plate 14, 16, as shown in FIGS. 6B and 6C.

As also shown in FIGS. 7A and 7B, when impacting or in contact with a plate 14, 16, the unsupported span portion 21 of the valve flap 18 becomes distorted under the pressure differential and deforms (e.g. is forced) partially into the release hole 11 of the open plate 14 and a hole 20 of the sealing plate 16, depending on whether the pressure differential is causing the valve 10 to be opened or closed.

When in the closed position, as shown in FIG. 7A, there is a high wear point 24 on the valve flap 18 at the edge of the hole 20 in the sealing plate 16. At this point 24 (or "impact region"), significant physical abrasion on the flap 18 can occur due to the impact of the flap 18 with the sharp, etched hole edge at high frequencies. The effect of the fluid pressure on the flap 18 may also cause the flap 18 to be dragged across the sharp hole edge and partially into the hole 20 as it is forced against the sealing plate 16. Cyclic fatigue as the flap 18 is repeatedly deformed over the edges of the holes 20 in the sealing plate 16 also causes increased level of wear.

When the valve 10 is in the open position as shown in FIG. 7B, there are wear points 26 on the other side of the valve flap 18 at the edge of the open plate 14 where the flap 18 is unsupported. Misalignment between the open plate 14 and the sealing plate 16 as a result of assembly tolerances may also give rise to increased wear of the flap 18 in the region 31 of the flap 18 close to the valve flap hole 22 where portions of the flap 18 are unsupported by the open plate 14. Misalignment between the open plate 14 and the sealing plate 16 also results in high wear points arising where the sealing hole edges 23 and the edges 25 of the release hole 11 may coincide, as illustrated by the dotted line 27 in FIG. 7B, which will cause both sides 15, 17 of the valve flap 18 to be worn away on at the same point i.e. at the coinciding wear points 26 on the valve flap 18.

To inhibit, reduce or otherwise minimise failure of the valve 10 caused by failure of the valve flap 18 through wear or fatigue as described above, it has been recognised that at least one of the plates 14, 16 may comprise one or more features arranged to control the distribution of one or more forces asserted on the flap 18 when the flap 18 impacts or is in contact with the or each plate 14, 16 by controlling the areas of the flap 18 over which said forces are asserted to inhibit wear of said flap 18 at said areas. The following description provides a non-exhaustive list of exemplary embodiments in which such features are provided.

In a first embodiment, the sharp edges of the etched holes 11, 19, 20 in the plates 14, 16 may be removed to inhibit wear and fatigue in the flap 18, as shown in FIG. 8. The inner edges 28, 30 of the holes 11, 19, 20 (i.e. the edges of the holes 11, 19, 20 on the sides of the plates 14, 20 facing inwards towards the cavity 12, and each other) have been rounded to create features comprising a rounded, smooth surface. The outer edges of the plates 14, 16 can also be rounded to provide similar features. The inner surfaces of both the sealing plate 16 and the open plate 16 are rounded because it is these surfaces (e.g. features) against which the valve flap 18 impacts (and deforms). Techniques for rounded the edges of the holes in the plates include a secondary etching process, electro-polishing, laser ablation, plasma treatment, or using a different fabrication method such as electroforming. This process can be applied to one or both of the sealing plate 16 and the open plate 14, as will be described in more detail below.

Rounding the inner edges of the holes 11, 19, 20 in both plates 14, 16 may also result in reduced flow restrictions as the fluid flows through the cavity 12 from one side of the valve 10 to the other side. These smooth or rounded edge features give rise to the reduction in flow restrictions through the valve structure 10, and hence the smooth or rounded edges may provide increased performance of the valve. This is because the fluid flow through the structure is smoother over the rounded edges, whereas the sharp edges may cause more turbulent flow at these locations. Less turbulence present in the fluid therefore results in decreased flow restrictions.

In another embodiment, valve fatigue may be reduced by providing a barrier feature between the flap 18 and the sharp edges of the holes 11, 19, 20 in the plates 14, 16. This barrier feature may be in the form of a support layer 36, as shown in FIG. 9A. The support layer 36, which includes holes 38 to allow fluid to flow through the support layer 36, as shown in FIG. 9B, is attached to the sealing plate 16 so that the holes 38 of the support layer 36 are substantially aligned with the holes 20 in the sealing plate 16. The diameter of the support layer holes 38 is, ideally, less than the diameter of the sealing plate holes 20 so that, when aligned and centred with respect to the sealing plate 16, the support layer 36 extends partially over the edges of the sealing plate holes 20 to form an extended portion 40.

This extended portion 40 is therefore a feature that prevents the flap 18 from coming into contact with the sharp edges of the sealing plate holes 20. In this case, it is not necessary for the edges of the sealing plate holes 20 to undergo any special treatment or fabrication process before the support layer 36 is attached because they will no longer come into contact with the valve flap 18.

Figure 9D:
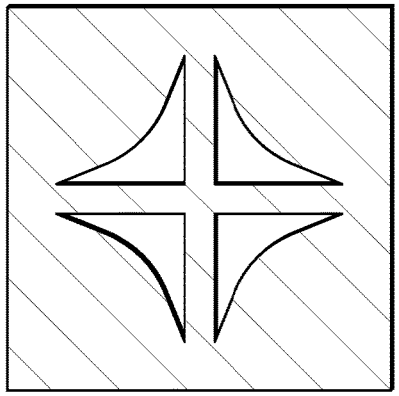
FIGS. 9B to 9G show top-down views of different support layers.
Figure 9G:
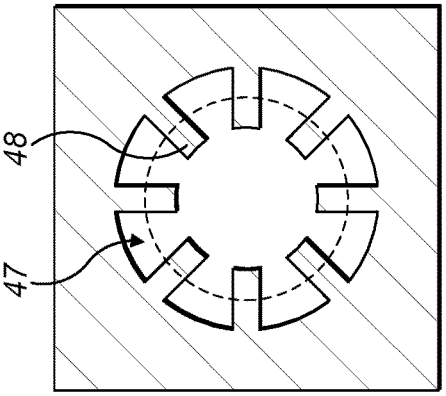
Figure 9C:
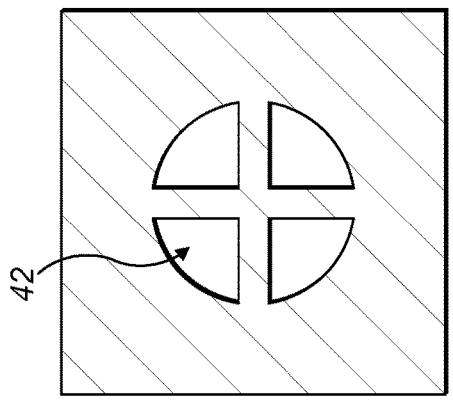

Cross supports 42 may be provided over the holes 38 in the support layer 36 to provide features that support the flap 18 whilst still allowing fluid to flow through the sealing plate holes 20, as shown in FIGS. 9C and 9D. By providing additional support to the flap 18, the amount of flexion and deformation that the flap 18 undergoes when under pressure is reduced, which in turn reduces the effects of cyclic fatigue on the flap 18. To further help reduce the amount of deformation experienced by the flap 18, the shape of the holes 38 in the support layer 36 can be optimised to provide a minimal open area that is sufficient to allow fluid to pass there through, for example as shown in FIG. 9D, thus providing a greater support surface for the flap 18.

Various materials can be used for the support layer 36 including, but not limited to, plastic (e.g. polyimide or PET), metal (e.g. an electro-polished layer), filter materials, and semiconductor materials. One of the main causes of valve wear is that the valve flap 18 decelerates rapidly when it hits the sealing plate 16 or the open plate 14. If the support layer 36 is made of plastic, or similar, the lower stiffness of the surface of the support layer 36 should "give" a little (i.e. the support layer 36 will compress slightly) when the valve flap 18 impacts it, which will reduce the forces experience by the valve flap 18 and so will reduce wear of the flap 18.

The support layer 36 can be attached to the sealing plate 16 using any common attachment method including, but not limited to, adhesives (e.g. pressure sensitive adhesives), welding (e.g. laser welding or resistance welding), diffusion bonding, or thermal processes (e.g. melting plastic onto metal surfaces).

The cross supports 42 in the support layer 36 can be fabricated during a pre-processing and alignment stage. For example, the support layer 36 may be pre-etched or a filter material may be prefabricated with multiple small holes. Alternatively, the cross-supports 42 can be defined using post-fabrication processes, for example using laser cutting once the support layer 36 has been attached to the sealing plate 16.

Although FIG. 9A illustrates holes 38 which are smaller in diameter than the holes 20 in the sealing plate 16, the holes 38 in the support layer 36 could be the same size as, or even larger than, the holes 20 in the sealing plate 16. Cross supports 42 in the support layer 36 allow larger holes to be used as the cross supports 42 will still prevent the flap 18 from coming into contact with the sharp edges of the sealing layer 16.

Figure 9F:
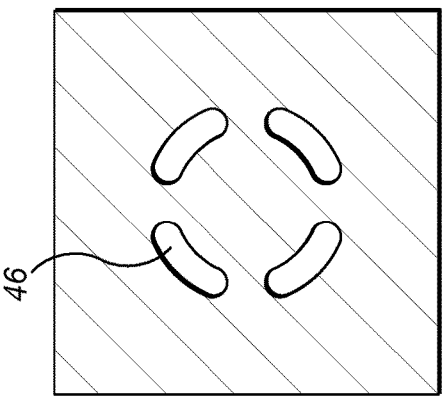
Figure 9B:
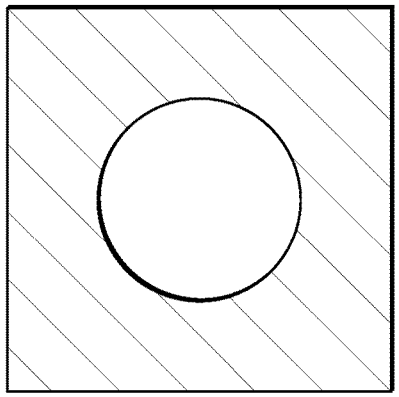
Figure 9E:
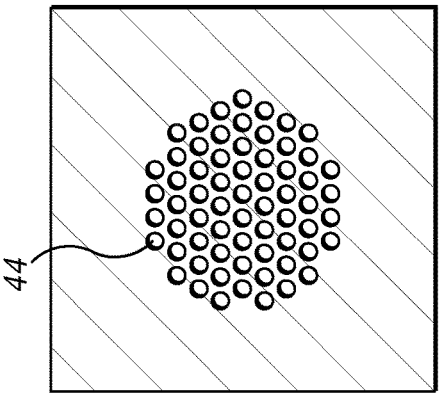

In one aspect, the holes 38 in the support layer may comprise many small apertures 44 per sealing hole 20, which features are shown in FIG. 9E. In another aspect, the holes 38 in the support layer may comprise a series of slots 46, preferably arranged in a generally circular configuration, which features are shown in FIG. 9F. In another aspect, the flap 18 may be supported only at discrete points around the edge of the sealing hole 20, as shown in FIG. 9G. In this case, the cross supports 42 can be replaced by support fingers 48 which features extend radially towards (but do not necessarily reach) the centre of the sealing hole 20. The support fingers 48 act to reduce the effective diameter of the holes 38 in the support layer 36 so that they are smaller than the diameter 47 of the holes 19 in the sealing layer 16, and therefore support the flap 18.

In order to prevent fluid from leaking between the flap 18 and the support layer 36, the support layer 36 is ideally provided with a sealing edge (not shown) for the valve flap 18 to seal against. Thus, the sealing edge ensures that the valve flap holes 22 are not coincident with the support layer holes 38, preventing leakage. In some examples, the sealing edge is provided around the holes 38 in the support layer 36, having a substantially annular structure. In other examples, the sealing edge has an elongate structure so that the sealing edge extends across a portion of the support layer 36. In such examples, the sealing edge may be thought of as a sealing surface.

Figure 10A:
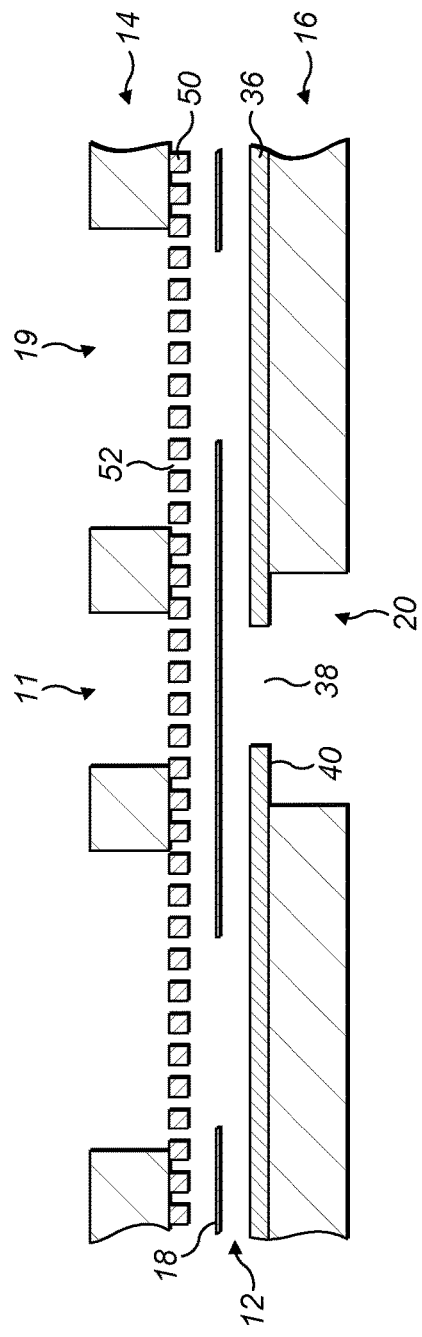
FIG. 10A shows a schematic cross-section view of a valve with an additional support layer.
Figure 10D:
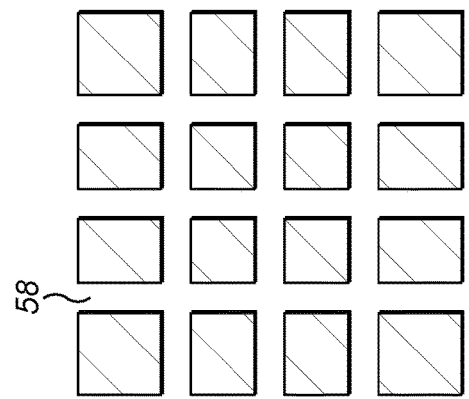
FIGS. 10B to 10D show top-down views of different additional support layers.

In another embodiment, in addition to providing a (first) support layer 36 on the sealing plate 16, the feature of an additional (second) support layer 50 may be provided on the open plate 14. This second support layer 50 includes a plurality of holes 52 to allow fluid to flow through it, as shown in FIG. 10A. Ideally, the diameter of the holes 52 in the second support layer 50 are much less than the diameter of the holes 19 in the open plate 14 so that each hole 19 in the open plate 20 is associated with a plurality of (smaller) second support layer holes 52. The holes 52 in the second support layer 50 are also much narrower in diameter than the holes 38 of the sealing plate support layer 36. The number of holes 52 in the second support layer 50 may be more than are present in the open plate 14. Alternatively, the number of holes 52 in the second support layer 50 may correspond to the number of holes 19 in the open plate 14 so that there is a 1:1 relationship.

Similar to what is described above, the second support layer 50 prevents the valve flap 18 from coming into contact with the sharp edges on the open plate 14 when the flap 18 moves to the open plate 14. The support layer 50 may avoid the need for the edges of the open plate 14 to undergo any special treatment or fabrication process because the flap 18 will not be coming into contact with this part of the valve 10. The second support layer 50 therefore provides support to the valve flap 18 over the holes 19 of the open plate 14 as well as over the release hole 11, which is more likely to damage to the valve flap 18 than the holes 19 due to wear of the flap 18 at the edges and the unsupported span 21 of the flap 18 across the release hole 11. Supporting the flap 18 reduces the need for high alignment tolerances because the intersection of high wear points from above and below the flap 18 is avoided.

As before, it is important to ensure that the flap 18 does not wear against the holes 52 of the second support layer 50. This can be achieved by using an arrangement of relatively small holes 52 or by only providing holes 52 on the portion of the support layer 50 where they are needed. For example, FIG. 10B shows an array of small apertures 56, which cover the support layer 50 in a regular arrangement. These relatively small apertures 56 prevent the flap 18 from deforming under fluid pressure without restricting the flow of fluid through the support layer 50.

Figure 10C:
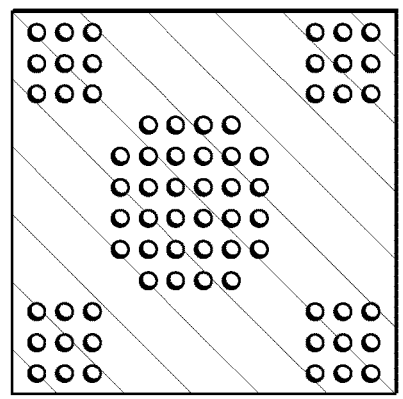
Figure 10B:
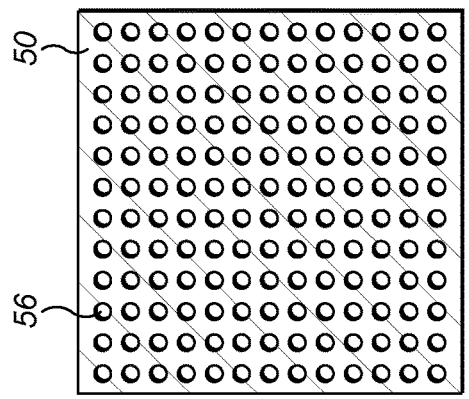

Alternatively, a second support layer may have many small apertures 56 but only in the part of the support layer 50 than is aligned with an open plate hole 19 and the release hole 11 is shown in FIG. 10C. That is, the small apertures 56 are only provided at places in the second support layer 50 that allow fluid to flow directly through the open plate 14; apertures 56 are not needed in the portion of support layer 50 that is directly beneath a part of the open plate 14, which does not have an aperture, as fluid will not be able to flow through this region.

As another alternative, a second support layer 50 may use flow channels 58 instead of small apertures. A waffle-like structure is therefore provided instead of a mesh-like structure. In this case, fluid is able to flow along the inner surface of the open plate 14 and out through the holes 19 in the open plate 14. This configuration exposes more of the back 17 of the valve flap 18. This is important because at least part of the back 17 of the valve flap 18 needs to be exposed to the fluid pressure in order to move the valve flap 18 away from the open plate 14. The channels 58 therefore ensure that even when the valve flap 18 is positioned right next to the open plate 14, or the second support layer 50, air pressure can be applied to the top, or back surface 17, of the valve flap 18 to move the valve flap 18 away from the open plate 14, or second support layer 50.

In another embodiment, the edges of the holes 19, 20 in the plates 14, 16 may be covered by a coating 60. The feature of a coating 60 can be applied to both the open plate 14 and the sealing plate 16, as shown in FIG. 11A. Here, the coating 60 fully covers the surfaces of the plates 14, 16, as well as at least a portion of the inside surfaces of the holes 19, 20 in both plates. The coating 60 provides a smooth, rounded surface 61 that covers the potentially sharp edges of the holes 19, 20 on the plates 14, 16, thereby providing a protective barrier between the flap 18 and the hole edges.

Ideally, both the internal and external surfaces of the plates 14, 16 (i.e. the entire surfaces) are coated, as shown in FIG. 11A. However, it is more important to coat the internal surfaces of the plates 14, 16, and of course the holes 11, 19, 20, because, in use, the flap 18 will contact the inner edge of the holes 19, 20 on the inner surfaces of the plates 14, 16, as explained previously. It is unlikely that the flap 18 will come into contact with the external surfaces 63 on either the open plate 14 or the sealing plate 16 so coating the external surfaces of the plates 14, 16 may not be considered necessary.

In some aspects, the inner surface of only one of the plates, instead of both plates, may be coated. For example the inner surface of the sealing plate 16 may be coated while the inner surface of the open plate 14 is not. In other aspects, both the internal and external surfaces of one plate will be coated while the internal and external surfaces of the other plate remain uncoated. For example, both the internal and external surfaces of the sealing plate 16 can be coated while the internal and external surfaces of the open plate 14 remain uncoated.

During coating of the plates 14, 16, a mask may be applied to the external surfaces of the plates 14, 16 to prevent the coating 60 from being applied to those exterior surfaces such that only the interior surfaces of the plates 14, 16 and inside the holes 11, 19, 20 are provided with the coating 60, thereby to achieve the configuration shown in FIG. 11B. Alternatively, the entire plate can be covered with the coating 60, which can then be removed from the external surfaces either before or after the valve 10 has been assembled. The coating 60 can be removed using any suitable method, for example laser machining. Leaving the external surfaces of the plates 14, 16 free from a layer of coating 60 can aide assembly of the valve, for example by allowing electrical connections to be made between electrical components and the valve plates 14, 16 for electrical singulation.

Once applied, the coating 60 forms a smooth, continuous layer over the surface of the plates. This feature effectively buries the edges of the holes 11, 19, 20 in the plates 14, 16 that may cause wear or fatigue in the valve flap 18, as shown in FIGS. 11A and 11B; the coating 60 itself does not exhibit any sharp edges or failure locations/defects. The coating 60 may be a "hard" coating, for example comprising Copper or Chromium Nitride, or a "soft" coating, for example comprising Parylene. Ideally, the coating 60 has a thickness that is less than half the diameter of the holes in the plate it is covering so as to prevent the coating 60 from obstructing or blocking the holes.

A soft coating 60, such as Parylene, may be preferred because the softer material will provide a reduced impact force on the areas of the flap 18 contacting it, with the added benefit of the coating 60 effectively burying the potentially sharp etched edges of the holes 19, 20 on the plates 14, 16.

Any suitable process can be used to coat the plates including, but not limited to, electroplating, electrodeposition, sputtering, chemical vapour deposition, or spin coating. Areas of the flap 18 can be left free of coating 60, for example by masking pre-coating or selectively removing post-deposition. The coating-free areas may be beneficial making electrical connection; clearing areas ready for laser drilling of apertures 22; and bonding (thereby avoiding the risk of delamination when bonding), for example.

The above-described embodiments each disclose ways of removing sharp edges on the plates 14, 16 forming the valve 10. These approaches can be extended to allow improvements to the valve performance through a combination of opening up the flow channel by increasing the channel height without increasing the distance through which the valve flap 18 travels between plates, and allowing air above and below the valve 10 to escape more effectively which increases the response of the valve flap 18. These improvements aim to reduce flow restrictions whilst keeping the valve flap dynamics the same, as will be described in more detail below.

FIG. 12A shows an example of a valve 10 in which a new flow structure has been formed in the sealing plate 16 by selectively removing material from the interior surface of the sealing plate 16 to create a recess 62, which reduces flow restrictions by providing a larger area through which fluid can flow. That is to say, the maximum channel height, which corresponds to the (maximum) height of the valve cavity 12, has been effectively increased.

As can be seen in FIG. 12A, by creating a recess 62 in the interior surface of the sealing plate 16, a region of increased height 64 with respect to the rest of the surface of the sealing plate 16 is thereby provided at the edges of the holes 20. The region of increased height 64 means that, despite the presence of the recess 62, the distance over which the flap 18 has to travel between the open plate 14 and the sealing plate 16 to perform its function during operation of the valve has not increased. Thus, flow restrictions are reduced while the valve flap 18 dynamics remain substantially the same as described previously.

The region of increased height 64 forms a sealing edge 66 on the sealing plate 16 which provides one end constraint for the motion of the valve flap 18. The sealing edge 66 has a shape that is generally narrower in the flow direction than in the direction perpendicular to the flow direction.

The recess 62 is created by selectively removing part of the surface of the sealing plate 16 from a region outside the sealing edge 66. In this context, "outside" refers to any part of the sealing plate 16 that is separated from the sealing plate hole 20 by the sealing edge 66, as illustrated in FIG. 12B. The sealing edge 66 has a substantially annular shape and the rest of the surface of the sealing plate 16 forms the recess 62.

In the configuration shown in FIG. 12B, the sealing edge 66 may provide only a small area of support for the flap 18, which may cause the flap 18 to bend or deform partially into the recessed area 62. To overcome this problem, the recessed area 62 can include a number of support structures 68, which features are shown in FIG. 12C. The support structures 68 are created by leaving additional areas of the sealing plate 16 intact so that the valve flap 18 is supported across a larger surface area. By placing the support structures 68 substantially evenly distributed throughout the recessed area 62 the flap 18 may be evenly supported across the valve 10 structure without increasing flow restrictions. Any suitable fabrication process can be used to form the support structures 68 including etching, laser machining, or spark eroding.

In another example, a valve 10 having a new flow structure, similar to that described above with respect to FIGS. 12A to 12C, may comprise a coating 60 similar to the example of FIGS. 11A and 11B. The feature of a coating 60 may be selectively applied to or removed from the surface of a plate to create the new flow structure, such as that shown in FIG. 13A, rather than removing part of the sealing plate 16 as with the previously described example. This design provides the advantage of increasing the maximum height of the flow channel (i.e. cavity 12) while ensuring that the edges of the sealing plate 16 are buried under the smooth coating 60.

In one aspect, this structure may be achieved by applying a layer of coating 60 to the external surface of the sealing plate 16, the internal surface of the sealing plate holes 20, and partially to the internal surface of the sealing plate 16. The "partial" coating 60 on the internal surface of the sealing plate 16 provides a raised sealing edge 74 surrounding each hole 20 on the sealing plate 16. The sealing edge 74 acts to protect the valve flap 18 from the edge of the sealing plate hole 20 and provides an end constraint for the valve flap 18 range of motion. The raised sealing edge 74 has a shape that is generally narrower in the flow direction than in the direction perpendicular to the flow direction. The partial coating 60 at the edge of the holes 20 increase the height of the plate 16 in that region 70, and thereby decreases the height of the channel (or cavity 12) in the region 70 of the sealing edge 74.

A region of increased channel height 72 is provided between the two plates 14, 16 where the internal surface of the sealing plate 16 is devoid of coating 60. This region 72 surrounds the holes (and hence the raised sealing edge 74) on the sealing plate 16, as shown in FIG. 13B. Here, "outside" means any part of the sealing plate 16 that is separated from the sealing plate hole 20 by the raised sealing edge 74. As can be seen in FIG. 13B, the raised sealing edge 74 has a substantially annular shape (e.g. similar to the shape of the hole 20) and the remainder of the surface of the sealing plate 16 forms the region of increased channel height 72.

The region of increased sealing plate height 70 means that the distance over which the flap 18 has to travel between the open plate 14 and the raised sealing edge 74 has not been increased even though the channel height has increased. This configuration therefore provides reduced flow restrictions without increasing the distance over which the flap 18 has to travel between the two plates 14, 16.

To ensure that the flap 18 is sufficiently supported over the region of increased channel width 72, this area can include a number of support structures 76, an example of such features being shown in FIG. 13C. Here, the support structures may comprise four pairs of elongate portions 76 of coating 60, for example, spaced equally around the sealing edge 74 with the elongate portions 76 extending away from the circular sealing edge 74 in a generally perpendicular direction. Ideally, the support structures 76 are evenly distributed within the region of increased channel height 72 so that the flap 18 is evenly supported across the valve 10 structure without substantially increasing flow restrictions.

The support structures 76 can be created by applying a coating to the internal surface of the sealing plate 16 and then selectively removing parts of the coating using, for example, laser machining or lithography. Alternatively, the structures 76 can be created by selectively applying a coating to the internal surface of the sealing plate 16 by, for example, selectively growing or printing a coating on the desired areas. In some cases a mask is applied to certain areas of the sealing plate 16 which are to be left uncovered, the sealing plate 16 is then coated, and the mask is subsequently removed. The coating 60 used can be the same coating as described with respect to FIG. 11.

As well as providing raised support structures 76 on the sealing plate 16, additional structures 78 can also be provided on the open plate 14, an example of which features are shown in FIG. 14. These structures 78 constrain the motion of the valve flap 18 whilst allowing air to move more freely above the flap 18 as it opens. The additional structures 78 are created in a similar manner to the support structures 76 on the sealing plate 16 described in relation to FIG. 13. That is, the open plate 14 is covered in a coating 60, which is then selectively removed from parts of the internal surface of the open plate 14 to create the desired structure 78.

These additional structures 78 can take on variety of different forms including flow channels 80, for example as shown surrounding the release hole 11 in FIG. 14B, or an array of protrusions (or "islands") of coating 82, for example as shown surrounding the release hole 11 in FIG. 14C.

Another valve structure which allows air to move freely above the flap 18 as it opens is illustrated in FIGS. 15A to 15C. This valve structure has a similar configuration to the valves 10 described in relation to FIGS. 12A-12C and FIGS. 13A to 13C. In this example, a partial support layer 84, which may be provided by a similar coating 60, creates a raised sealing edge 84 around the sealing hole 20 and thereby a region of increased channel height 86 over the remaining part of the sealing plate 16, as shown in FIG. 15B. Additional raised support valve structures 88, similar to those described for FIG. 13C, may also be provided throughout the region of increased channel height 86 to help support the flap 18 across the valve 10 structure.

The partial support layer 84 can be created using any suitable fabrication process for example the layer may be a pre-fabricated structure (e.g. an etched support structure) which is attached to the sealing plate 16, or the layer may be created during assembly (e.g. via laser machining).

In some cases, a combination of support structures is provided so that the advantages of each individual support structure can be combined into one overall valve 10.

FIG. 16A illustrates a feature combining the support layer 36 described in relation to FIG. 9, the coating 60 described in relation to FIG. 11, and the raised sealing edge 74 described in relation to FIG. 13. Advantageously, this combination of different structures protects the valve flap 18 from the hole edges in the sealing plate 16 whilst providing support for the valve flap 18 across the valve 10. This combination of features provides the potential for smaller holes to be present in the sealing plate 16 because it is possible to etch smaller holes into the thinner material of the support structure. In this implementation, the support structure includes a metal support layer (made up of a layer of metal 20 microns in thickness and a hole diameter of 100 microns) which reduces stress across the unsupported span. This metal support layer is then also coated in order to prevent sharp edges from cutting into the valve flap 18.

It is also possible to combine the additional support structures present on the open plate 14, as described in relation to FIGS. 14B and 14C, with the structure shown in FIG. 16A.

FIG. 16B shows a valve structure 10 which is similar to that shown in FIG. 16A, except that only the support layer 90 is coated, rather than the sealing plate 16 and part of the support layer 90. The support layer 90 is bonded to the sealing plate 16 after it has been coated.

Instead of providing various structures on the sealing plate 16 and open plate 14 to prevent the flap 18 from coming into contact with the edges of the holes 19, 20, the valve flap 18 can itself be reinforced instead, as shown in FIGS. 17A and 17B. Such features on the flap 18 avoid the need to apply additional structures, coatings, or layers to the plates 14, 16.

As illustrated in FIG. 17A, a surface of the valve flap 18, for example the lower surface 15 of the valve flap 18, closest to the sealing plate 16, can be covered in a coating 92. This coating 92 completely covers one surface of the flap 18 and improves the robustness of the flap 18 as well as resistance to wear when the flap 18 comes into contact with the edges of the sealing hole 20. In some cases, both surfaces 15, 17 of the valve flap 18 are coated to provide additional resistance to wear when the flap 18 comes into contact with the edges of the holes 19 in the open plate 14.

In order to minimise the effect of a higher mass valve flap 18, the coating 92 may be provided selectively on regions 94 of a surface of the valve flap 18, for example regions 94 of the lower surface 15 of the flap 18 as shown in FIG. 17B. The regions 94 of coating 92 still improve the robustness of the flap 18 in the areas that are prone to wear without substantially increasing the weight of the flap 18. Thus, the valve flap 18 dynamics remain substantially the same as with previously described valve structures.

With both a flap 18 that has a surface entirely covered with coating 92 and a flap 18 that has a surface having coating 92 only in regions 94, the coating 92 may be a sacrificial layer which can help extend the lifetime of the flap 18. In some cases, the coating 92 may be a more compliant material which reduces the effects of impact or friction damage to the flap 18 as it comes into contact with the edges of the valve plate holes 19, 20. In other cases, the coating 92 may be a strong material which is more wear-resistant than the material of the valve flap 18, to protect the valve flap 18 from damage.

To create a partial coating 92 in regions 94 on a surface of a flap 18, as shown in FIG. 17B, the coating 92 may be applied across a complete surface of the flap 18 and then selectively removed (for example, using a laser removal technique) to leave the a partial coating 92 in regions 94. Alternatively, the surface of the flap 18 may be selectively masked and the coating 92 then applied to the surface of the valve flap 18. Once the mask is removed, partial coating 92 remains in the desired regions 94.

Some of the concepts described above result in a non-metallic layer in the stack of valve structure components which may make assembly of the valve 10 a challenge if laser welding is used. In order to address this problem, several different approaches for valve assembly can be used.

Figure 18A:
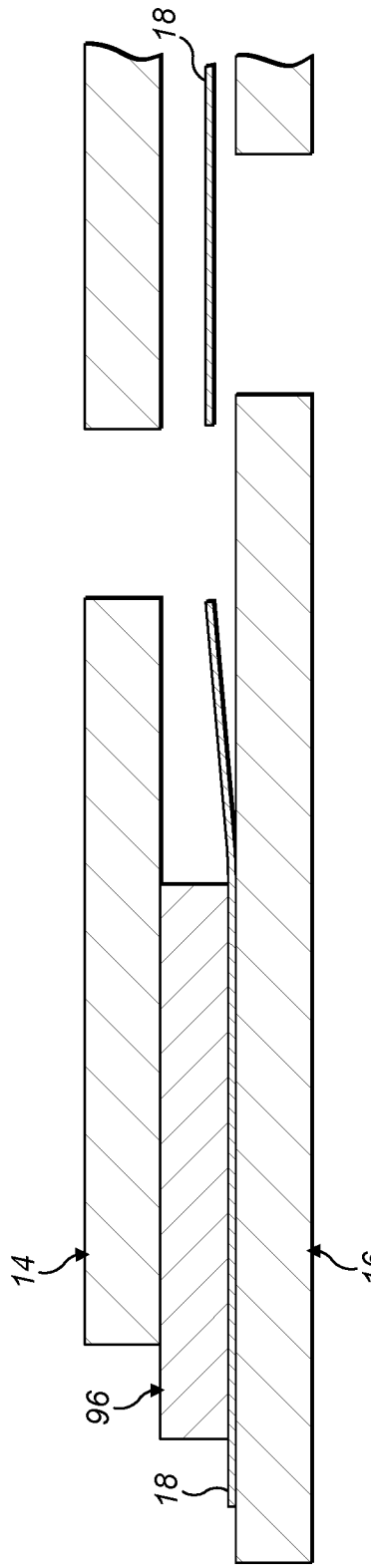

As can be seen in FIG. 18A, the open plate 14 and the sealing plate 16 may be spaced apart from each other by a shim plate 96 located between the sealing plate 16 and the open plate 14. The valve flap 18 is retained between the shim plate 96 and the sealing plate 16.

The presence of the thin, typically plastic, valve flap 18 poses a challenge for welding the valve 10 together as the flap 18 does not conduct heat well between the open plate 14 and the shim plate 96. This poor heat conduction hinders creation and mixing of melt pools required for welding. This concern is addressed by performing a "drag weld" across a tapered stack of the components 16, 96, 14 to form a "metal bridge". This weld is carried out by forming notches in the periphery of the open plate 14 so that a laser can heat the components in the stack from the bottom up, starting with the formation of a melt pool first in the sealing plate 16, without the need for melting through the open plate 14. Once the melt pool has been established on the sealing plate 16, the laser beam may be dragged sideways towards the centre of the valve structure thereby extending the melt pool into the shim plate 96 and the open plate 14, forming a weld with a number of laser pulses and a bead like structure, known as a metal bridge. When the weld cools, all the components will be secured together.

This process of drag welding dramatically reduces the laser power required for the initial melting of the sealing plate 16 because heat is transmitted directly to the sealing plate 16 by radiation (i.e. the laser beam) rather than by conduction through the valve flap 18, shim plate 96, and open plate 14. Drag welding also minimizes the production of any ejected material from the weld site and significantly mitigates any damage to the components resulting from the heat created by the welding process. The drag welding process may be further improved by using a blanket of inert gas such as, for example, argon or nitrogen, to further reduce or eliminate ejected material from the weld site.

Although bonding by soldering may provide a more robust solution, the temperature required for soldering stainless steel components increases the possibility of damaging the valve components, especially the valve flap 18 which is typically made from a polymer. The drag welding process as described above is therefore the preferred method for bonding the valve components together.

Figure 18B:
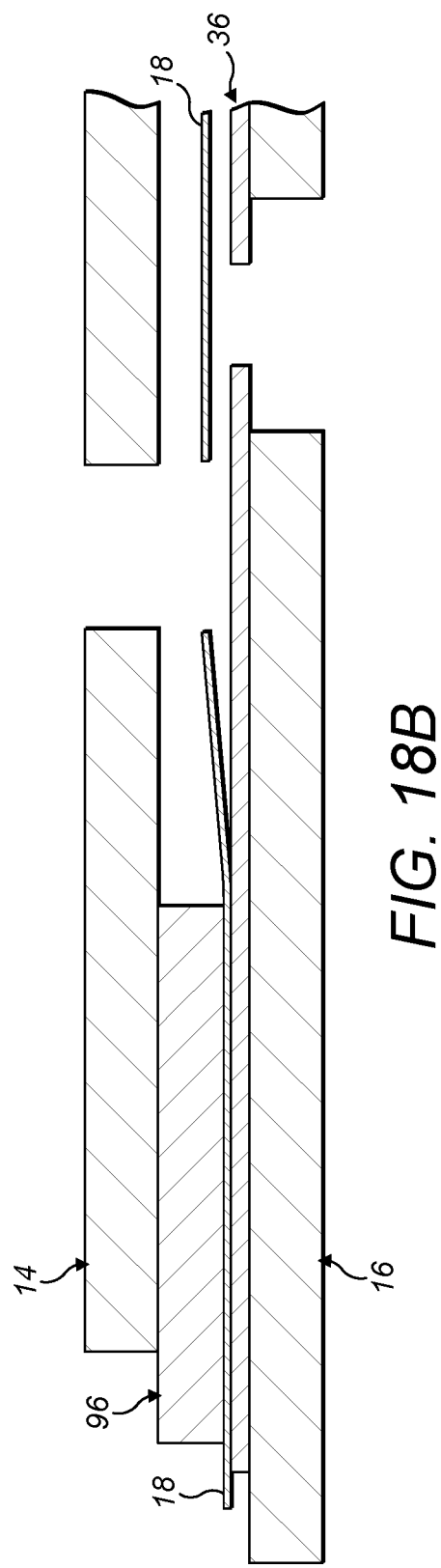

If the valve structure requires a support layer 36, as shown in FIG. 18B, the inclusion of an insulating support layer provides an additional challenge because the support layer 36 significantly increases the thickness of the insulating layer (i.e. now the valve flap 18 and the support structure 36 which cannot be easily welded).

FIG. 18C illustrates one method of resolving the above-mentioned problems. As can be seen, a part of the support structure 36 is selectively removed in areas 100 where the weld 98 is required. A part of the valve flap 18 is also selectively removed in the same area 100 where the weld 98 is to be located. A shim plate 102 including protrusions 104 is inserted into the area 100 created by selective removal of parts of the support layer 36 and valve flap 18. The protrusions 104 form a region of increased thickness in the central portion of the shim plate 102, as can be seen in FIG. 18C. The edges or peripheral portions of the shim plate 102 are therefore thinner compared to the protrusions 104. The protrusions 104 can be created using any suitable fabrication process, for example by part etching the peripheral parts of the shim plate 102. The thickness of the protrusions 104 needs to be larger than the combined thickness of both the valve flap 18 and the support layer 36, as shown in FIG. 18C. This ensures that the protrusions 104 can extend through both the valve flap 18 and the support layer 36 allowing the shim plate 102 to be welded 98 to the sealing plate 16 via the protrusions 104.

FIG. 18D shows a plan view of the valve shown in FIG. 18C. As can be seen in FIG. 18D(i), the shim plate 102 has a substantially annular shape and the protrusions 104 are generally evenly distributed around the circumference of the shim plate 102. The support layer 36 comprises multiple areas 100 which have been selectively removed, these areas forming an annular shape, as shown in FIG. 18D(ii), which corresponds to the annulus of the shim plate 104. Each area of the support layer 36 that has been selectively removed is slightly larger than the size of the protrusions 104 on the shim plate 102 so that these areas 100 can fully accommodate the protrusions 104, as shown in FIG. 18D(iii).

Using a part etched shim plate 102 and selectively removing areas 100 of the support layer 36 allows the valve flap 18 and support layer 36 to be continuous out to a leadframe, which is a structure around each valve which allows many valves to be built at one time. This approach reduces how much of the support layer 36 needs to be removed and allows the support layer 36 and the valve flap 18 to be held by the leadframe during assembly (if required).

FIG. 18E shows a simpler version of FIG. 18D, where a larger area of support structure is removed and a simpler shim plate 96 without protrusions 104 is welded onto the sealing plate 16. In this approach, the area 106 of the support layer 36 which has been removed forms a continuous annulus, instead of discrete areas 100 as shown in FIG. 18D(ii). The width of the annulus of the removed area 106 is slightly wider than the width of the annulus of the shim plate 96 so that the support layer 36 can fully accommodate the shim plate 96, as shown in FIG. 18E(iii).

As previously noted, it will be understood that the present invention has been described above purely by way of example, and modifications of detail can be made within the scope of the invention. For example, any feature in a particular aspect described herein may be applied to another aspect, in any appropriate combination. It should also be appreciated that particular combinations of the various features described and defined in any aspects described herein can be implemented and/or supplied and/or used independently. Thus, while the foregoing is directed to exemplary aspects and embodiments of the present invention, other and further aspects and embodiments of the invention will be apparent to those skilled in the art from consideration of the specification, and may be devised without departing from the basic scope thereof, which is determined by the claims that follow.

The invention claimed is:

1. A valve for controlling fluid flow, the valve comprising:
    a first plate comprising a plurality of first apertures extending generally perpendicular through said first plate;
    a second plate comprising a plurality of second apertures extending generally perpendicular through said second plate, the second apertures being substantially offset from the first apertures of said first plate;
    a spacer disposed between said first plate and said second plate to form a cavity therebetween in fluid communication with the first apertures of said first plate and the second apertures of said second plate;
    a flap disposed and moveable between said first plate and said second plate, the flap having apertures substantially offset from the first apertures of said first plate and substantially aligned with the second apertures of said second plate;
    wherein the flap is operable to be motivated between said first and second plates in response to a change in direction of a differential pressure of the fluid across the valve; and
    wherein at least one of said first plate or said second plate comprises one or more features arranged to control the distribution of one or more forces asserted on the flap when the flap impacts or is in contact with said first plate or second plate by controlling areas of the flap over which said forces are asserted to inhibit wear of the flap at said areas;
    wherein the one or more features comprises at least one region of increased height on a surface of the first or second plate, said at least one region being of increased height with respect to the rest of the surface of the first or second plate, preferably wherein the at least one region of increased height forms at least part of an edge of an aperture in said plate;
    wherein the at least one region of increased height is formed via a coating, which extends at least partially across an inner surface of the first plate or the second plate.

2. The valve of claim 1, wherein said areas of the flap over which said forces are asserted are areas of the flap that impact or contact regions of said first or second plate adjacent the first apertures or the second apertures.

3. The valve of claim 2, wherein said regions of said first or second plate are edges of the first apertures or the second apertures.

4. The valve of claim 1, wherein the one or more features comprises a coating that extends at least partially across an internal surface of at least one of said first plate or second plate, and preferably extends at least partially into the apertures of said first plate or second plate to cover at least part of an internal surface of the apertures.

5. The valve of claim 4, further comprising a further coating that extends at least partially across an internal surface of the other of said first or second plate, and preferably extends at least partially into the apertures of the other of said first or second plate to cover at least part of an internal surface of the apertures, and more preferably wherein the further coating extends at least partially across an external surface of the second plate.

6. The valve of claim 4, wherein the coating or the further coating has a thickness that is equal to less than half the diameter of the first or second apertures on said first or second plate on which said coating is applied.

7. The valve of claim 1, wherein the one or more features is a substantially curved surface of said first or second plate, the substantially curved surface forming at least part of one or more edges that defines the first apertures or the second apertures, preferably wherein the substantially curved surface forms at least part of an inner edge that defines one or more apertures of the first aperture or the second apertures.

8. The valve of claim 7, wherein the substantially curved surface forms at least part of an outer edge that defines one or more apertures of the first apertures or the second apertures.

9. The valve of claim 7, wherein both the first and second plates comprise substantially curved surfaces on the first and second apertures on inner edges of the first and second plates.

10. The valve of claim 1, wherein the one or more features comprises a support layer disposed between the flap and the first or second plate, preferably wherein the support layer is attached to the first or second plate, preferably wherein the support layer has at least one aperture that is substantially aligned with at least one of the apertures on the first or second plate.

11. The valve of claim 10, wherein the support layer comprises a plurality of apertures, preferably arranged into at least one set, the at least one set being associated with an aperture on the first or second plate.

12. The valve of claim 11, wherein the support layer comprises a plurality of apertures arranged into a plurality of sets, each of said plurality of sets being associated with a respective aperture on the first or second plate.

13. The valve of claim 10, wherein the diameter of the at least one aperture of the support layer is less than the diameter of the apertures in the first or second plate.

14. The valve of claim 10, wherein the one or more features comprises a further support layer disposed between the flap and the other of the first or second plate, preferably wherein the further support layer is attached to the other of the first or second plate, and more preferably wherein the further support layer has at least one aperture, preferably wherein the diameter of the at least one aperture in the further support layer is less than the diameter of the aperture of the support layer.

15. The valve of claim 1, wherein the at least one region of increased height is on an inner surface of the first or second plate, and preferably wherein the surface of the first or second plate surrounding the at least one region of increased height is recessed.

16. The valve of claim 1, wherein the at least one region of increased height is formed via a raised support layer disposed on the surface of the plate, preferably wherein the raised support layer is at least partially covered by a coating, and more preferably wherein the coating completely covers the raised support layer, and more preferably wherein the coating extends into the apertures in the plate such that it at least partially covers an internal surface of the apertures.

17. The valve of claim 1, wherein the flap comprises a coating which extends at least partially across a surface of the flap, preferably wherein the flap coating is arranged to contact either said first plate or said second plate when the flap is moved towards said respective first or second plate.

18. The valve of claim 1, wherein said first plate and said second plate both comprise said one or more features.

\* \* \* \* \*